(12) United States Patent
Dong et al.

(10) Patent No.: US 12,152,817 B2
(45) Date of Patent: Nov. 26, 2024

(54) GAS-LIQUID SEPARATION DEVICE AND THERMAL MANAGEMENT SYSTEM

(71) Applicant: ZHEJIANG SANHUA INTELLIGENT CONTROLS CO., LTD., Shaoxing (CN)

(72) Inventors: Junqi Dong, Shaoxing (CN); Haifeng Dong, Shaoxing (CN)

(73) Assignee: ZHEJIANG SANHUA INTELLIGENT CONTROLS CO., LTD., Shaoxing (CN)

( * ) Notice: Subject to any disclaimer, the term of this patent is extended or adjusted under 35 U.S.C. 154(b) by 202 days.

(21) Appl. No.: 17/922,373

(22) PCT Filed: Apr. 28, 2021

(86) PCT No.: PCT/CN2021/090665
§ 371 (c)(1),
(2) Date: Oct. 30, 2022

(87) PCT Pub. No.: WO2021/219026
PCT Pub. Date: Nov. 4, 2021

(65) Prior Publication Data
US 2023/0213251 A1    Jul. 6, 2023

(30) Foreign Application Priority Data

Apr. 30, 2020    (CN) .......................... 202010367481.5

(51) Int. Cl.
*F25B 43/00*    (2006.01)
*B01D 19/00*    (2006.01)
(Continued)

(52) U.S. Cl.
CPC ........ *F25B 43/006* (2013.01); *B01D 19/0042* (2013.01); *F25B 40/00* (2013.01);
(Continued)

(58) Field of Classification Search
CPC ........ F25B 43/006; F25B 43/00; F25B 40/00; F25B 40/02; F25B 40/06; F25B 2500/28;
(Continued)

(56) References Cited

U.S. PATENT DOCUMENTS

| | | | |
|---|---|---|---|
| 6,681,597 | B1 | 1/2004 | Yin et al. |
| 2008/0000261 | A1 | 1/2008 | Klotten et al. |
| 2014/0116653 | A1 | 5/2014 | Lange et al. |

FOREIGN PATENT DOCUMENTS

| | | |
|---|---|---|
| CN | 103162458 A | 6/2013 |
| CN | 203837333 U | 9/2014 |

(Continued)

*Primary Examiner* — Emmanuel E Duke
(74) *Attorney, Agent, or Firm* — Cheng-Ju Chiang

(57) ABSTRACT

A gas-liquid separation device includes a heat exchange member having a heat exchange tube spirally wound around a first cylinder body. The heat exchange tube includes a first flow passage, a tube wall surrounding the first flow passage, and a first extension portion protruding from the tube wall. A second flow passage is formed between the first cylinder body, the second cylinder body, and the heat exchange tube. The first extension portion is located in the second flow passage. A heat exchange area between the heat exchange tube and a fluid in the second flow passage is increased. The heat exchange effect between a fluid in the first flow passage and the fluid in the second flow passage is improved. A thermal management system having the gas-liquid separation device is also disclosed.

20 Claims, 13 Drawing Sheets

(51) Int. Cl.
*F25B 40/00* (2006.01)
*F25B 40/02* (2006.01)
*F25B 40/06* (2006.01)

(52) U.S. Cl.
CPC .............. *F25B 40/02* (2013.01); *F25B 40/06* (2013.01); *F25B 2500/28* (2013.01)

(58) Field of Classification Search
CPC ..................... F25B 2500/18; F25B 2400/051; F25B 39/00; B01D 19/0042; F28F 1/422; F28F 1/025; F28D 7/024; F28D 7/02
See application file for complete search history.

(56) References Cited

FOREIGN PATENT DOCUMENTS

| | | | | |
|---|---|---|---|---|
| CN | 109579368 | A | 4/2019 | |
| CN | 110195947 | A | 9/2019 | |
| CN | 110857822 | A * | 3/2020 | .............. F25B 13/00 |
| CN | 212378295 | U | 1/2021 | |
| CN | 112432403 | A | 3/2021 | |
| DE | 3119440 | A1 | 12/1982 | |
| DE | 102016108312 | A1 * | 11/2017 | ............ F16L 37/252 |
| DE | 102018214178 | A1 | 2/2020 | |
| RU | 2351864 | C1 | 4/2009 | |

* cited by examiner

GAS-LIQUID SEPARATION DEVICE AND THERMAL MANAGEMENT SYSTEM

CROSS-REFERENCE TO RELATED APPLICATION

This application is a 35 U.S.C. § 371 National Phase conversion of International (PCT) Patent Application No. PCT/CN2021/090665, filed on Apr. 28, 2021, which claims priority of a Chinese Patent Application No. 202010367481.5, filed on Apr. 30, 2020 and titled "GAS-LIQUID SEPARATION DEVICE AND THERMAL MANAGEMENT SYSTEM", the entire content of which is incorporated herein by reference. The PCT International Patent Application was filed and published in Chinese.

TECHNICAL FIELD

The present application relates to a field of air-conditioning components, and in particular, to a gas-liquid separation device and a thermal management system.

BACKGROUND

In an air-conditioning system, an intermediate heat exchanger is used to exchange heat between a high-temperature refrigerant from a condenser and a low-temperature refrigerant from an evaporator to increase the temperature of the refrigerant entering a compressor. In a cooling mode, the temperature of the refrigerant before throttling can also be reduced, thereby improving the cooling efficiency of the evaporator. Most compressors can only compress a gaseous refrigerant. If a liquid refrigerant enters the compressor, it will cause liquid shock and damage the compressor. In order to reduce the risk of liquid shock on the compressor, a gas-liquid separator can be installed before the compressor.

In the related art, a gas-liquid separation device integrating heat exchange and gas-liquid separation functions is adopted. The gas-liquid separation device includes an inner cylinder body, an outer cylinder body and an interlayer cavity between the inner cylinder body and the outer cylinder body. A gas-liquid distribution assembly is located on an inner side of the inner cylinder body. A heat exchange member is located in the interlayer cavity. A refrigerant entering the interlayer cavity exchanges heat with the heat exchange member. In a cooling mode, the temperature of the refrigerant flowing into an expansion valve can be reduced, the cooling effect can be improved, and the liquid shock phenomenon of the compressor can be further reduced. In order to increase the heat exchange path of the refrigerant in the heat exchange member, the heat exchange tube is spirally wound around the inner cylinder body. The refrigerant in the interlayer cavity flows from top to bottom or from bottom to top, and exchanges heat with the refrigerant in the heat exchange tube. The larger the heat exchange area between the heat exchange tube and the refrigerant in the interlayer cavity, the better the heat exchange effect will be achieved.

SUMMARY

In view of the above problems existing in the related art, the present application provides a gas-liquid separation device with better heat exchange effect.

In one aspect, the present application provides a gas-liquid separation device including: a first cylinder body, a second cylinder body, a first flow guide portion, a second flow guide portion, a gas-liquid distribution assembly and a heat exchange member; the first cylinder body being located inside the second cylinder body, the gas-liquid separation device having a first cavity and a second cavity, the first cavity being located in the second cylinder body, the first cavity being located outside the first cylinder body, the second cavity at least including a space within the first cylinder body; the first flow guide portion being fixed with the second cylinder body, the second flow guide portion being fixed with the second cylinder body, the first flow guide portion being located at one end of the second cylinder body in an axial direction, the second flow guide portion being located at another end of the second cylinder body in the axial direction, the first flow guide portion having a third cavity; the gas-liquid distribution assembly being fixed with the first flow guide portion, the gas-liquid distribution assembly being at least partially located in the second cavity, the gas-liquid distribution assembly communicating with the second cavity and the third cavity, the third cavity being in fluid communication with the first cavity; the heat exchange member including a heat exchange tube spirally wound around the first cylinder body, the heat exchange tube being at least partially located in the first cavity, one side of the heat exchange tube being adjacent to or attached to the first cylinder body, another side of the heat exchange tube being adjacent to or attached to the second cylinder body, the heat exchange tube including a first flow channel, a tube wall surrounding the first flow channel, and a first extension portion protruding from the tube wall, a second flow channel being formed between the first cylinder body, the second cylinder body and the heat exchange tube, the first extension portion being located in the second flow channel, the first flow channel being not in communication with the second flow channel.

In another aspect, the present application provides a gas-liquid separation device including: a first cylinder body, a second cylinder body, a first flow guide portion, a second flow guide portion, a gas-liquid distribution assembly and a heat exchange member; the first cylinder body being located inside the second cylinder body, the gas-liquid separation device having a first cavity and a second cavity, the first cavity being located in the second cylinder body, the first cavity being located outside the first cylinder body, the second cavity having a space inside the first cylinder body; the first flow guide portion being fixed with the second cylinder body, the second flow guide portion being fixed with the second cylinder body, the first flow guide portion and the second flow guide portion being located on different sides of the second cylinder body in an axial direction, the first flow guide portion having a third cavity which is in fluid communication with the second cavity and the first cavity; the gas-liquid distribution assembly being fixed with the first flow guide portion, the gas-liquid distribution assembly being at least partially located in the second cavity; the heat exchange member including a heat exchange tube surrounding the first cylinder body, the heat exchange tube being at least partially located in the first cavity, one side of the heat exchange tube being joined with the first cylinder body, another side of the heat exchange tube being joined with the second cylinder body, the heat exchange tube including a tube wall and a plurality of protrusions protruding from the tube wall, the plurality of protrusions being distributed along a circumferential direction of the tube wall, and the plurality of protrusions being spaced apart from each other.

In the present application, the heat exchange member includes the heat exchange tube spirally wound around the first cylinder body. One side of the heat exchange tube is adjacent to or attached to the first cylinder body, and another side is adjacent to or attached to the second cylinder body. The second flow channel is formed between the first cylinder body, the second cylinder body and the heat exchange tube. The heat exchange tube is provided with the first extension portion/protrusion that protrudes from the tube wall. The first extension portion/protrusion is located in the second flow channel. By providing the first extension portion/protrusion outside the tube wall, the heat exchange area between the heat exchange tube and the fluid in the second flow channel is increased, and the heat exchange effect between the fluid in the first flow channel and the fluid in the second flow channel is improved, thereby improving the heat exchange effect of the gas-liquid separation device.

A thermal management system includes: a gas-liquid separation device, an evaporator, a compressor, a condenser and a throttling device. The gas-liquid separation device includes a first cylinder body, a second cylinder body, a first flow guide portion, a second flow guide portion, a gas-liquid distribution assembly and a heat exchange member. The first cylinder body is located inside the second cylinder body. The gas-liquid separation device has a first cavity and a second cavity. The first cavity is located in the second cylinder body. The first cavity is located outside the first cylinder body. The second cavity at least includes a space inside the first cylinder body. The first flow guide portion is fixed with the second cylinder body. The second flow guide portion is fixed with the second cylinder body. The first flow guide portion is located at one end of the second cylinder body in an axial direction. The second flow guide portion is located at another end of the second cylinder body in the axial direction. The first flow guide portion has a third cavity. The gas-liquid distribution assembly is fixed with the first flow guide portion. The gas-liquid distribution assembly is at least partially located in the second cavity. The gas-liquid distribution assembly communicates with the second cavity and the third cavity. The third cavity is in fluid communication with the first cavity. The heat exchange member includes a heat exchange tube surrounding the first cylinder body. The heat exchange tube is at least partially located in the first cavity. One side of the heat exchange tube is adjacent to or attached to the first cylinder body, and another side of the heat exchange tube is adjacent to or attached to the second cylinder body. The heat exchange tube includes a tube wall and a plurality of protrusions protruding from the tube wall. Free ends of some of the protrusions are adjacent to or fit with the first cylinder body. The gas-liquid separation device has a first flow channel and a second flow channel. The first flow channel is located in the heat exchange tube. The second flow channel is located between the first cylinder body, the second cylinder body and the heat exchange tube. The protrusions extend to the second flow channel. The first flow channel is not in communication with the second flow channel. An outlet of the compressor communicates with an inlet of the condenser, an outlet of the condenser communicates with the first flow channel, an inlet of the throttling device communicates with the first flow channel, an outlet of the throttling device communicates with an inlet of the evaporator, an outlet of the evaporator communicates with the second cavity, and an inlet of the compressor communicates with the first cavity and the second flow channel.

DETAILED DESCRIPTION

Figure 1:
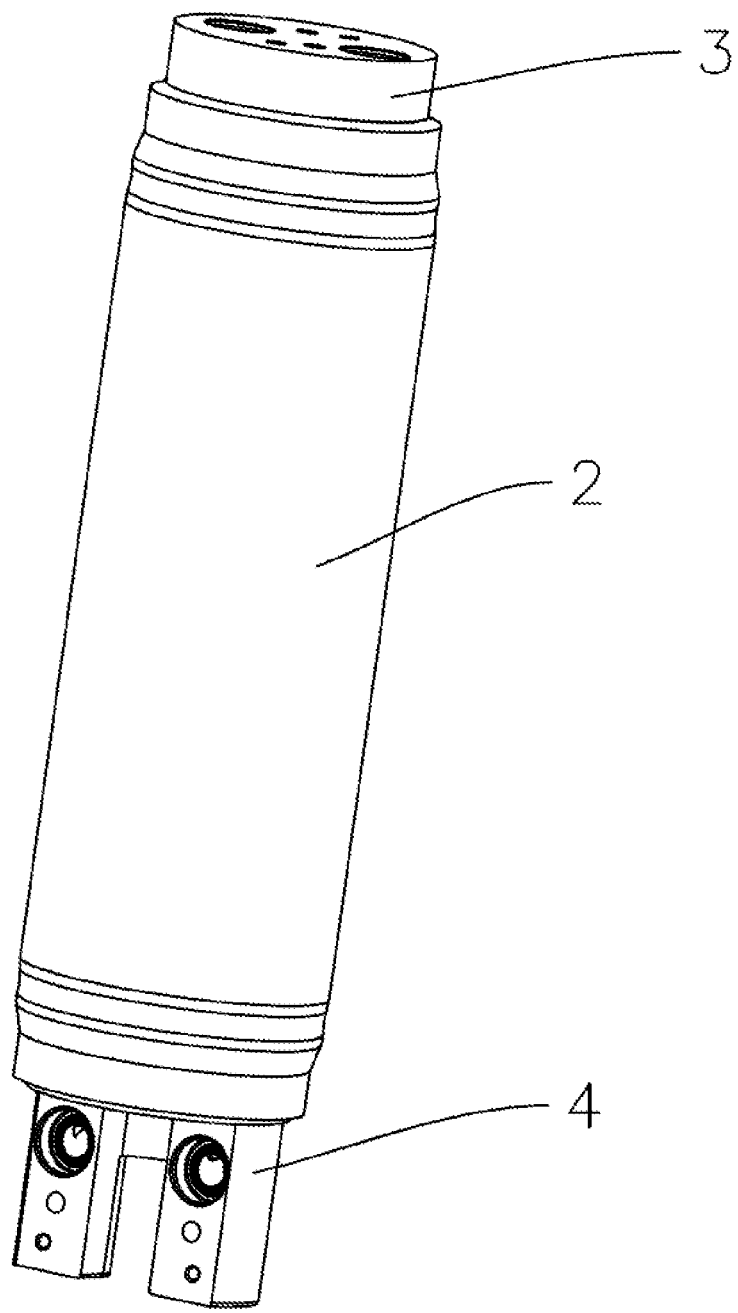
FIG. 1 is a schematic perspective structure view of a gas-liquid separation device in an embodiment of the present application.
Figure 2:
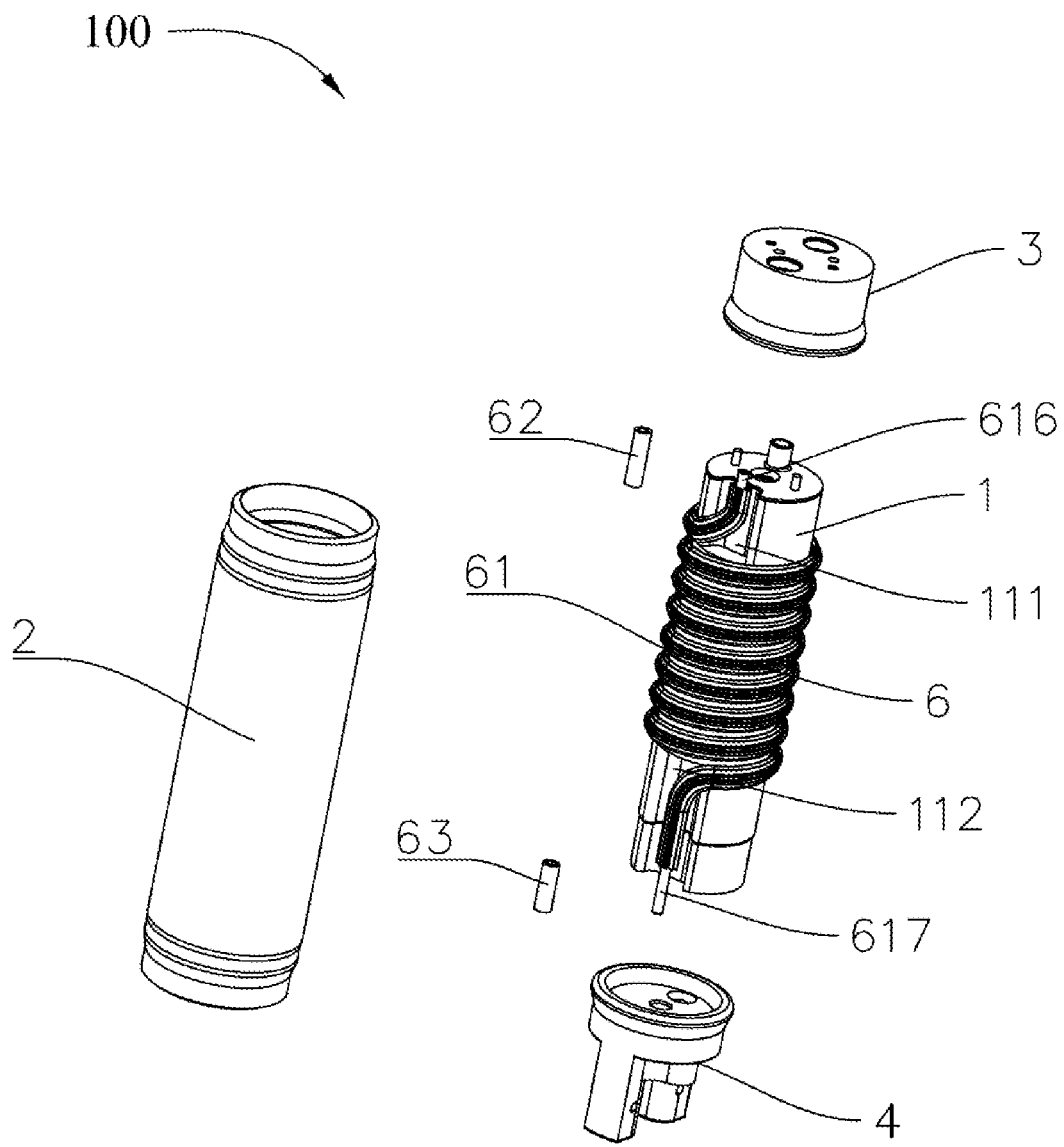
FIG. 2 is a schematic view of a partial exploded structure of the gas-liquid separation device in the embodiment of the present application.

The exemplary embodiments will be described in detail here, and examples thereof are shown in the drawings. When the following description refers to the drawings, unless otherwise indicated, the same numbers in different drawings indicate the same or similar elements. The implementation embodiments described in the following exemplary embodiments do not represent all implementation embodiments consistent with the present application. On the contrary, they are merely examples of devices and methods consistent with some aspects of the present application as detailed in the appended claims.

The terms used in the present application are only for the purpose of describing specific embodiments, and are not intended to limit the present application. The singular forms of "a", "said" and "the" described in the present application and appended claims are also intended to include plural forms, unless the context clearly indicates otherwise.

It should be understood that "first", "second" and similar words used in the specification and claims of the present application do not indicate any order, quantity or importance, but are only used to distinguish different components. Similarly, similar words such as "a" or "an" do not mean a quantity limit, but mean that there is at least one. Phrase "a plurality of" means a quantity of two or more. Unless otherwise indicated, similar words such as "front", "rear", "lower" and/or "upper" are only for convenience of description, and are not limited to one position or one spatial orientation. Terms such as "including" or "comprising" and other similar words mean that the elements or components before "including" or "comprising" now cover the elements or components listed after "including" or "comprising" and their equivalents, and do not exclude other elements or components.

The gas-liquid separation device according to the exemplary embodiment of the present application will be described in detail below with reference to the accompanying drawings. Features in the embodiments and implementations described below may complement each other or be combined with each other without conflict.

According to a specific embodiment of the gas-liquid separation device 100 of the present application, as shown in FIG. 1 to FIG. 10, the gas-liquid separation device 100 includes a first cylinder body 1, a second cylinder body 2, a first flow guide portion 3, a second flow guide portion 4, a gas-liquid distribution assembly 5 and a heat exchange member 6.

In this embodiment, the first cylinder body 1 includes a cylinder body portion 11 and a bottom cover 12. The cylinder body portion 11 and the bottom cover 12 can be formed separately and then connected together, or can be formed integrally. The bottom cover 12 is disposed at one end of the cylinder body portion 11 adjacent to the second flow guide portion 4. Both the cylinder body portion 11 of the first cylinder body 1 and the second cylinder body 2 are hollow circular cylinders with a substantially circular cross section. An outer diameter of the cylinder body portion 11 of the first cylinder body 1 is smaller than an inner diameter of the second cylinder body 2. The first cylinder body 1 is located inside the second cylinder body 2.

The gas-liquid separation device 100 has a first cavity 10 and a second cavity 20. The first cavity 10 is located inside the second cylinder body 2, and the first cavity 10 is located outside the first cylinder body 1. The second cavity 20 includes at least a space inside the first cylinder body 1. The gas-liquid distribution assembly 5 is at least partially located in the second cavity 20. The first cavity 10 at least includes a cavity surrounded by an outer wall surface of the first cylinder body 1 and an inner wall surface of the second cylinder body 2. The heat exchange member 6 is at least partially located in the first cavity 10.

The first flow guide portion 3 and the second flow guide portion 4 are fixed with the second cylinder body 2, respectively. One end surface of the second cylinder body 2 is surrounded by a part of the first flow guide part 3, and another end surface is surrounded by a part of the second flow guide part 4. One end face of the first cylinder body 1 opposite to the bottom cover 12 abuts against the first flow guide portion 3. The bottom cover 12 abuts against the second flow guide portion 4. In some embodiments, the first flow guide portion 3 may be connected to the first cylinder body 1 and the second cylinder body 2, or may abut against each other through a sealing structure. The second flow guide portion 4 can be connected to the first cylinder body 1 and the second cylinder body 2, or can abut against each other through a sealing structure. The first flow guide portion 3 has a third cavity 30. The gas-liquid distribution assembly 5 is fixed with the first flow guide portion 3. The gas-liquid distribution assembly 5 communicates with the second cavity 20, the third cavity 30 and the outside of the gas-liquid separation device 100. The third cavity 30 communicates with the first cavity 10.

Figure 3:
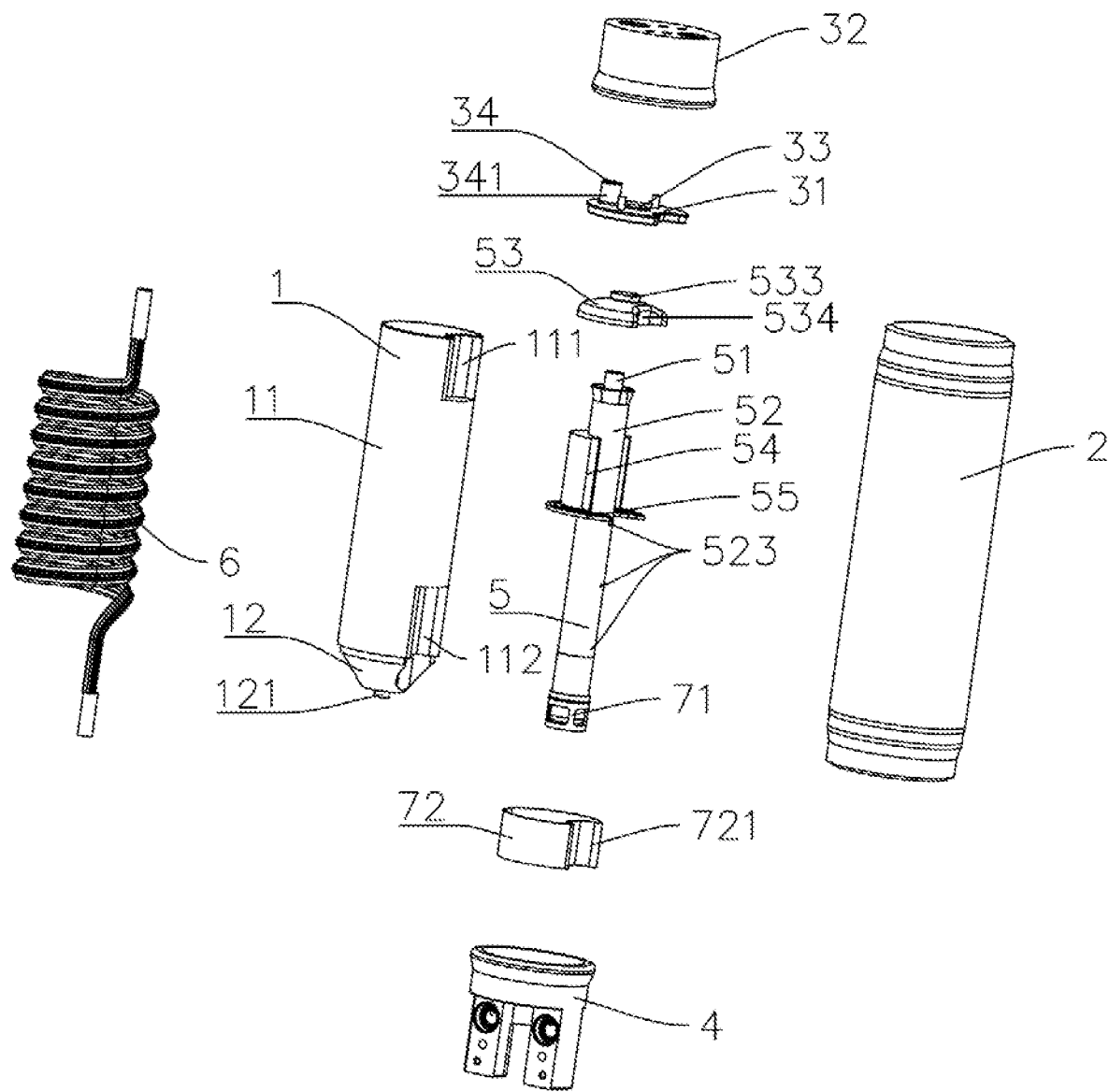
FIG. 3 is a schematic view of a partial exploded structure of the gas-liquid separation device in the embodiment of the present application.
Figure 9:
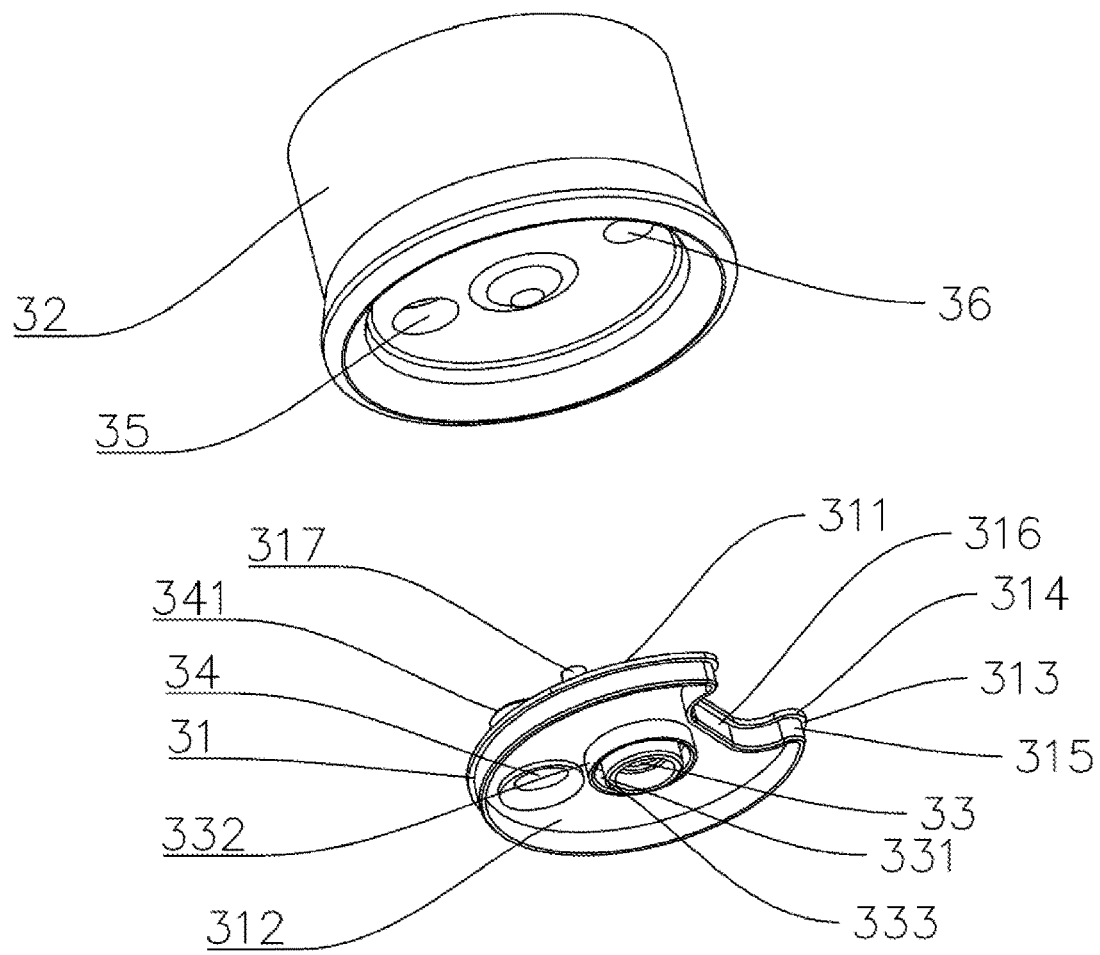
FIG. 9 is a schematic structural view of a first flow guide portion of the gas-liquid separation device in the embodiment of the present application.
Figure 10:
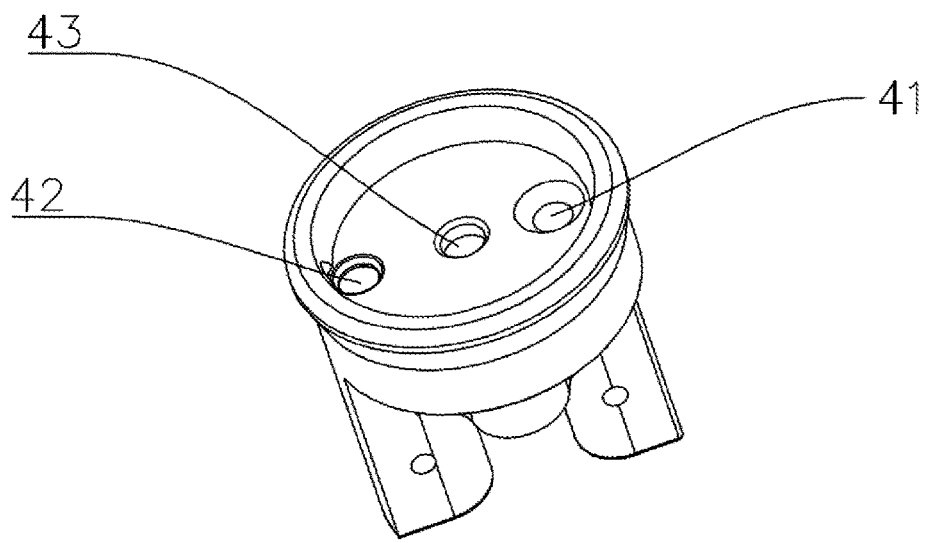
FIG. 10 is a schematic structural view of a second flow guide portion of the gas-liquid separation device in the embodiment of the present application.

In this embodiment, as shown in FIG. 3 and FIG. 9, the first flow guide portion 3 includes a first part 31 and a second part 32 disposed at intervals. The first part 31 is connected to the second part 32. Along an axial direction of the gas-liquid separation device 100, a projection of the first part 31 completely falls into a projection of the second part 32. The first part 31 is fixed with the first cylinder body 1. The second part 32 is fixed with the second cylinder body 2. The third cavity 30 includes at least a space between the first part 31 and the second part 32. The first part 31 includes a first through hole 33 communicating with the third cavity 30 and a second through hole 34 communicating with the second cavity 20. The second part 32 includes a third through hole 35 communicating with the outside of the gas-liquid separation device 100.

Along the axial direction of the gas-liquid separation device 100, a projection of the first cylinder body 1 completely falls into the projection of the first part 31. An outer contour shape of the first part 31 is substantially the same as a cross-sectional shape of the first cylinder body 1.

The first part 31 includes a first end surface 311 away from the first cylinder body 1, a second end face 312 opposite to the first end face 311, and a first stepped surface 313. The first stepped surface 313 divides the side wall surface of the first part 31 into two sections, namely, a first side wall surface 314 and a second side wall surface 315. The first stepped surface 313 is externally connected to the first sidewall surface 314, and is internally connected to the second sidewall surface 315. An upper end surface of the first cylinder body 1 abuts against the first stepped surface 313. In some embodiments, a part of the inner wall surface of the first cylinder body 1 is attached to the second side wall surface 315. The first through hole 33 and the second through hole 34 both form openings on the first end surface 311 and the second end surface 312. The upper end surface of the first cylinder body 1 is fixedly connected to the first part 31 by brazing or gluing. An end surface of the second part 32 adjacent to the first part 31 is provided with a third through hole 35 extending through the second part 32. The third through hole 35 communicates with the outside of the gas-liquid separation device 100 and the second cavity 20.

In some embodiments, referring to FIG. 2 to FIG. 6 and FIG. 9, the first end surface 311 of the first part 31 is provided with a first protruding portion 341. The first protruding portion 341 is disposed around the second through hole 34. One end of the first protruding portion 341 away from the first part 31 is at least partially accommodated in the third through hole 35 of the second part 32. Part of the outer sidewall of the first protruding portion 341 is connected to the second part 32. An inner cavity of the first protruding portion 341 communicates with the second through hole 34 and the third through hole 35. That is, the inner cavity of the first protruding portion 341 communicates with the outside of the gas-liquid separation device 100 and the second cavity 20. On the one hand, the connection between the first part 31 and the second part 32, and the communication between the outside of the gas-liquid separation device 100 and the second cavity 20 can be realized. On the other hand, a spacing distance between the first part 31 and the second part 32 can be ensured, leaving enough space for the third cavity 30. In some embodiments, referring to FIG. 3 and FIG. 9, in order to further ensure the distance between the first part 31 and the second part 32, the first part 31 or the second part 32 is provided with a support post 317. One end of the support post 317 abuts against the first part 31, and the other end abuts against the second part 32. Alternatively, the support post 317 is integrally formed with the first part 31 or the second part 32.

The second end surface 312 of the first part 31 is provided with a second protruding portion 331, a third protruding portion 332, and a first groove portion 333 located between the second protruding portion 331 and the third protruding portion 332. Both the second protruding portion 331 and the third protruding portion 332 are disposed around the first through hole 33. The third protruding portion 332 is disposed away from the first through hole 33 relative to the second protruding portion 331.

The gas-liquid distribution assembly 5 includes a flow guide pipe 51 and a first plate 53. The flow guide pipe 51 and the first plate 53 are fixed with the first part 31, respectively. The flow guide pipe 51 is at least partially located in the second cavity 20. One end of the flow guide pipe 51 is accommodated in the second protruding portion 331. Part of the outer sidewall of the flow guide pipe 51 is connected to the inner sidewall of the second protruding portion 331. An inner cavity of the flow guide pipe 51 communicates with the first through hole 33. That is, the inner cavity of the flow guide pipe 51 communicates with the third cavity 30. The first plate 53 is partially accommodated between the second protruding portion 331 and the third protruding portion 332. That is, the first plate 53 is accommodated in the first groove portion 333 to achieve the fixation of the first plate 53.

Figure 4:
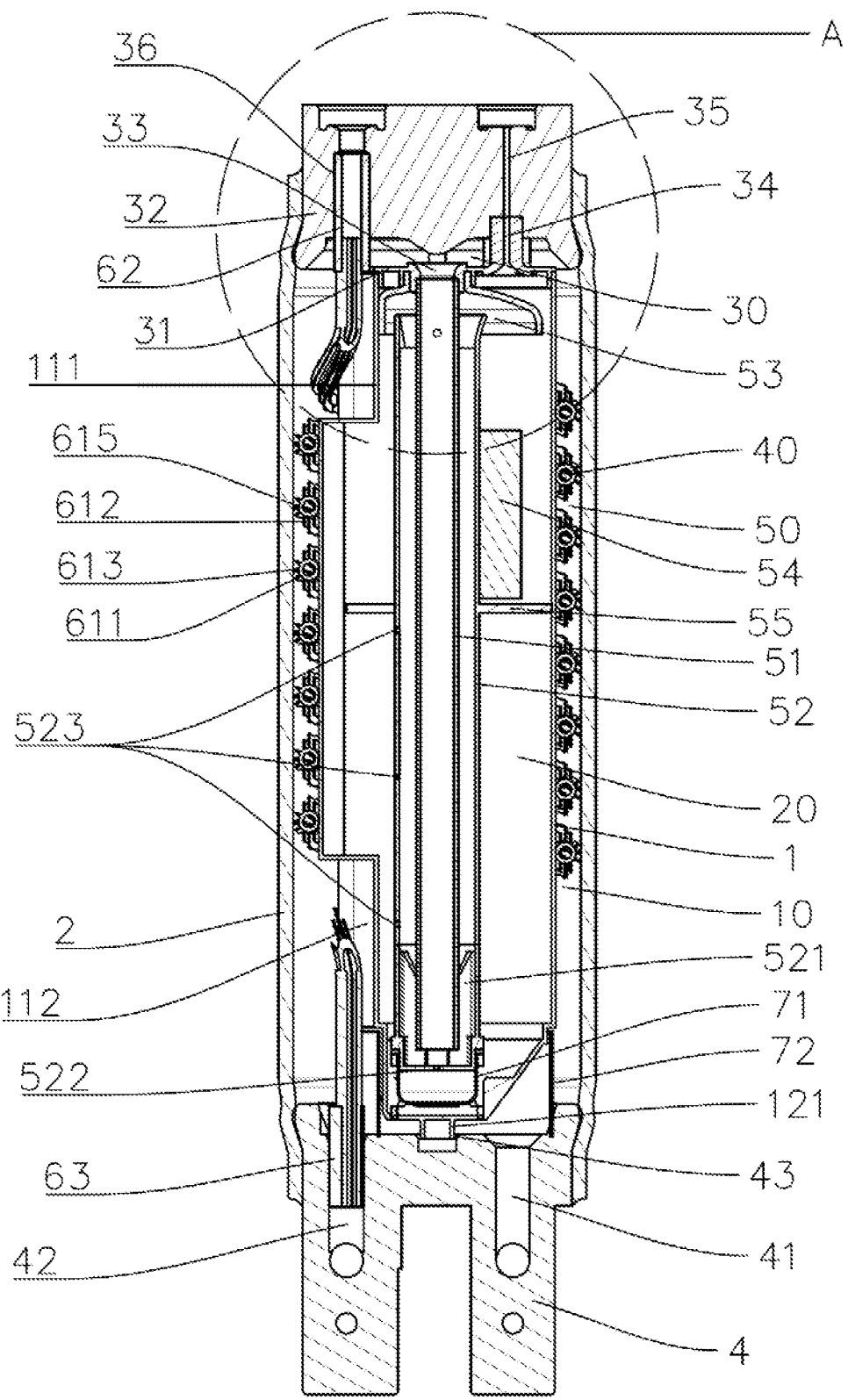
FIG. 4 is a schematic cross-sectional view of the gas-liquid separation device in an embodiment of the present application.
Figure 6:
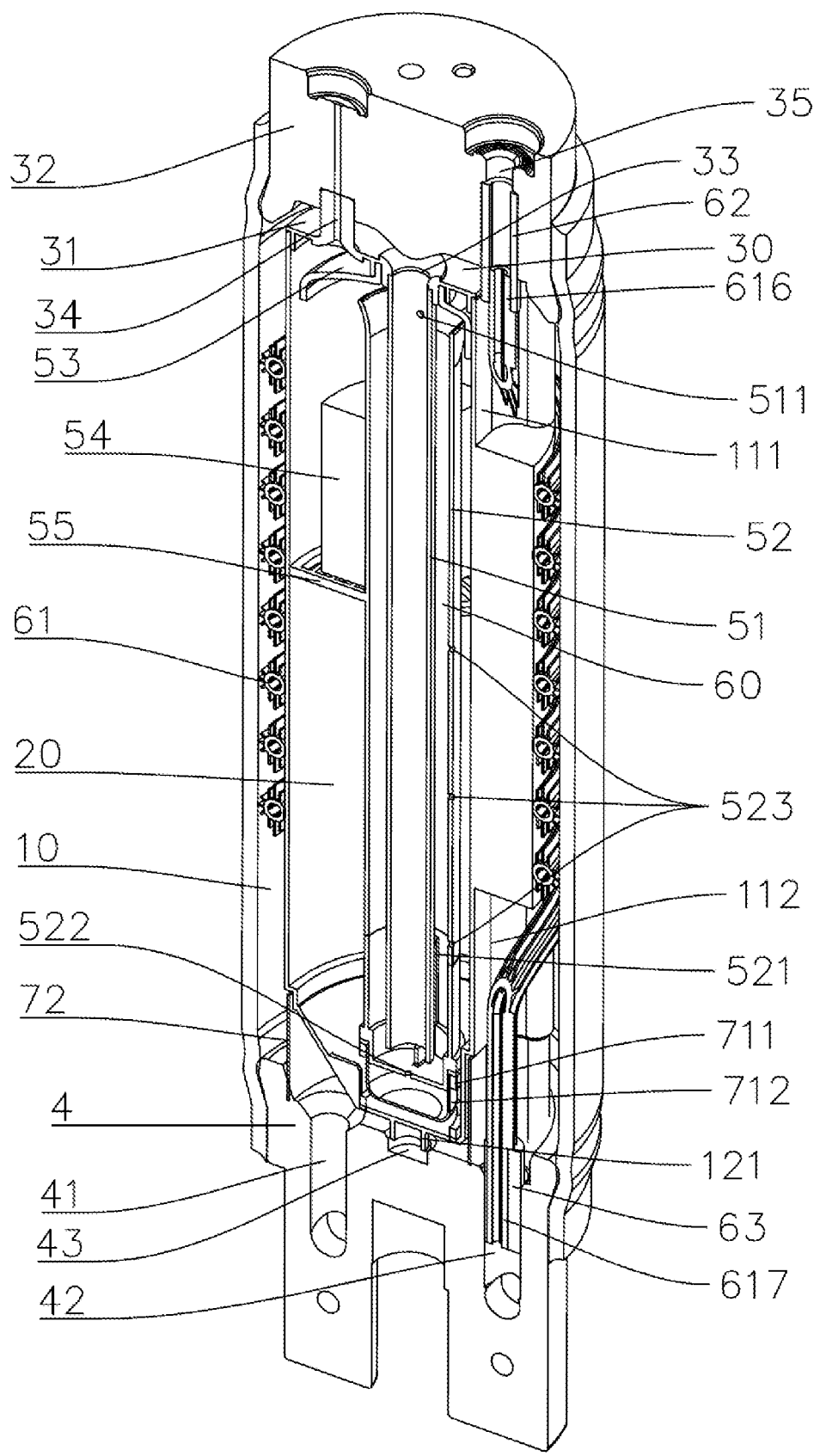
FIG. 6 is a schematic perspective cross-sectional view of the gas-liquid separation device in the embodiment of the present application.
Figure 7:
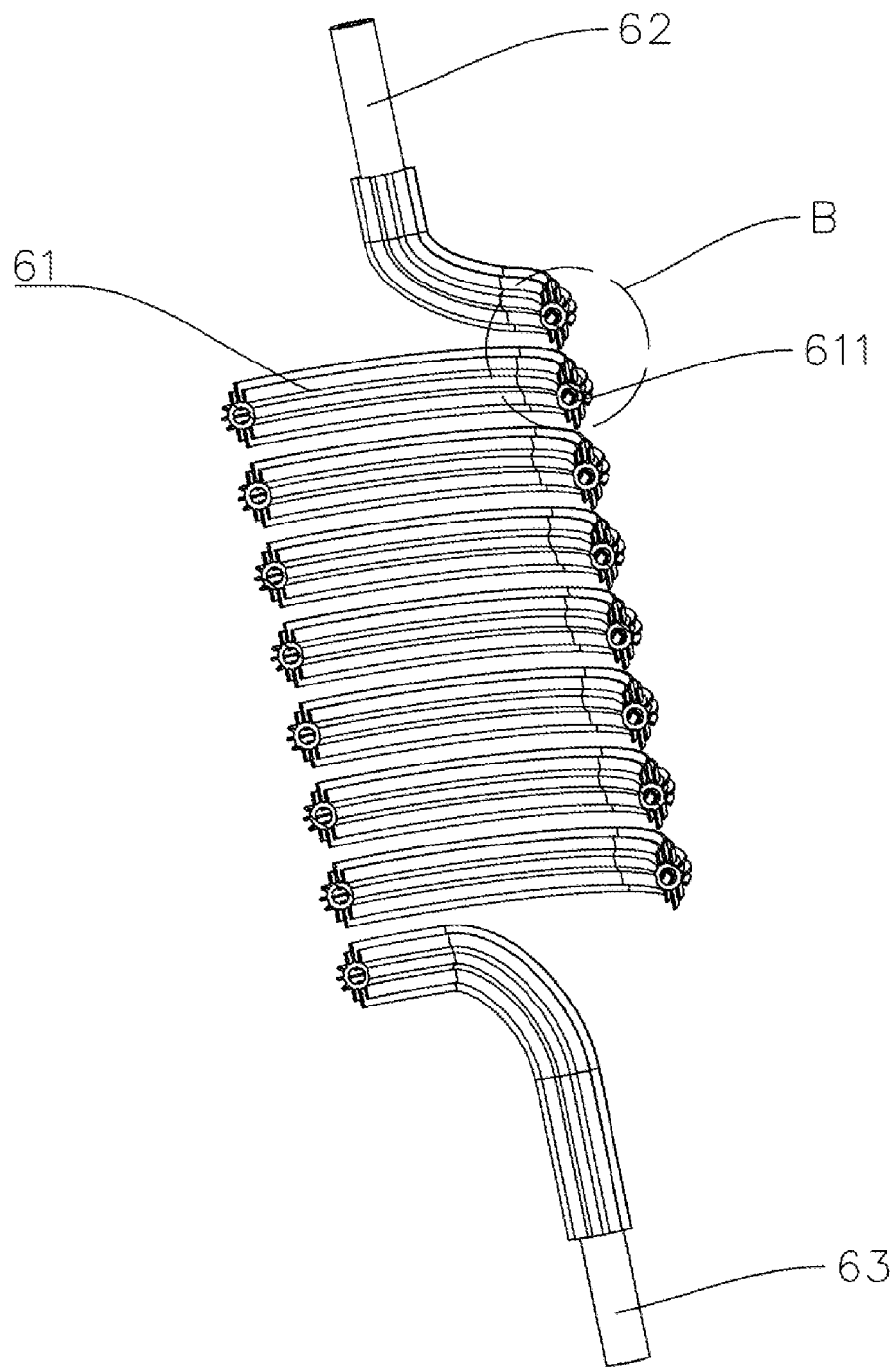
FIG. 7 is a schematic perspective cross-sectional view of a heat exchange member of the gas-liquid separation device in the embodiment of the present application.
Figure 8:
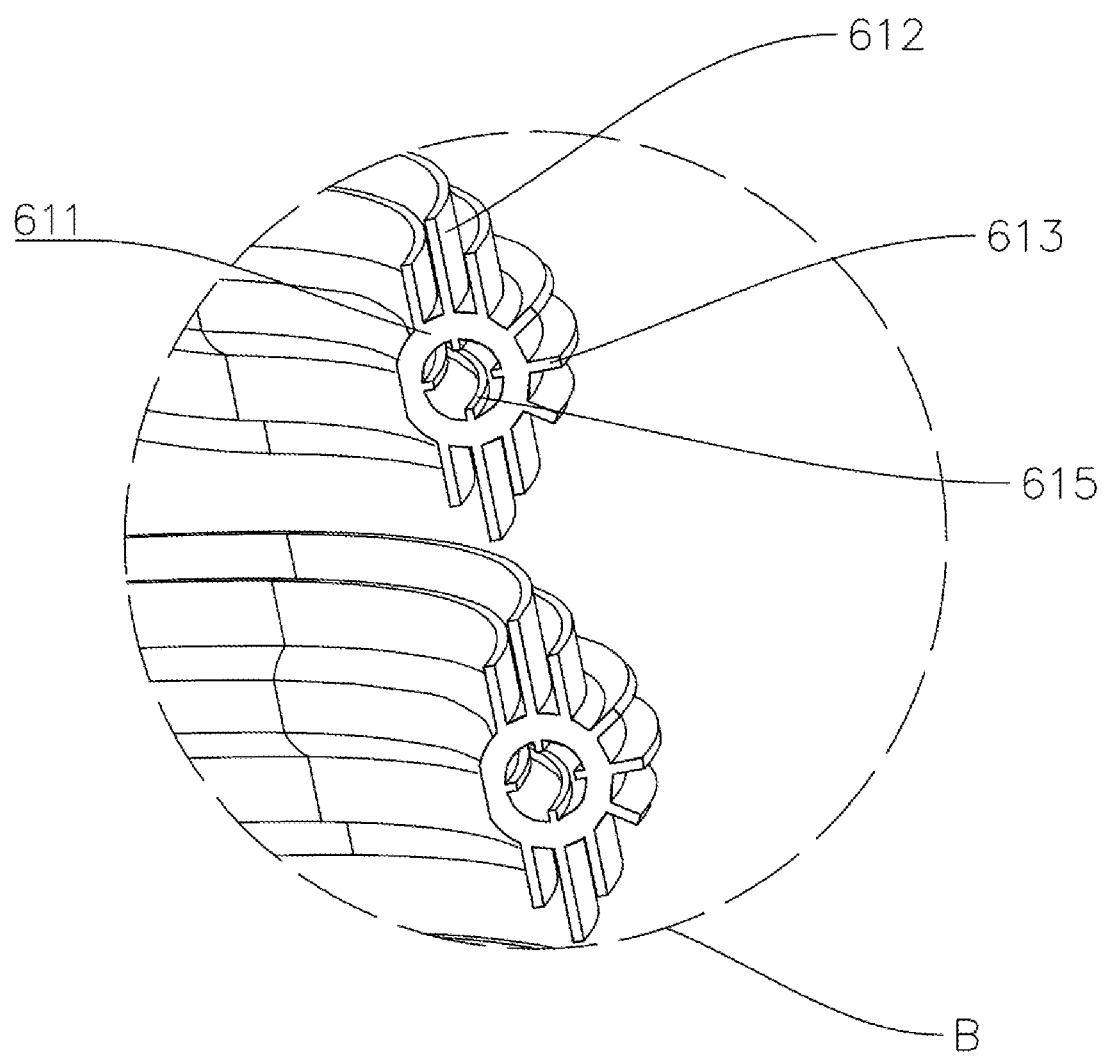
FIG. 8 is a partial enlarged view showing part B of FIG. 7.

In this embodiment, referring to FIG. 4, the second flow guide portion 4 is covered to an end of the second cylinder body 2 away from the first flow guide portion 3. Along the axial direction of the gas-liquid separation device 100, a projection of the second flow guide portion 4 completely falls into a projection of the second cylinder body 2. The second flow guide portion 4 has a fourth through hole 41 which communicates with the outside of the gas-liquid separation device 100 and the first cavity 10. Along the axial direction of the gas-liquid separation device 100, the fourth through hole 41 is divided into two sections. Referring to FIG. 6, a section away from the first cavity 10 is a substantially straight first section, and a section adjacent to the first cavity 10 is a substantially flared second section. A contour size of a cross section of one end of the second section is the same as that of the first section, and a contour size of a cross section of the other end of the second section is larger than that of the first section, thereby reducing the resistance when the fluid in the first cavity 10 enters the fourth through hole 41.

The bottom cover 12 of the first cylinder body 1 is provided with a first support member 121 abutting between the first cylinder body 1 and the second flow guide portion 4. In this embodiment, as shown in FIG. 3, FIG. 4 and FIG. 6, the first support member 121 is a substantially straight cylinder. The second flow guide portion 4 is provided with a second groove portion 43 for accommodating the first support member 121 to increase the stability of the first cylinder body 1. In some other embodiments, the first support member 121 may be disposed on the second flow guide portion 4. The bottom cover 12 of the first cylinder body 1 is provided with a groove portion for accommodating the first support member 121.

In the present embodiment, during installation, the end face of the end of the first cylinder body 1 opposite to the bottom cover 12 abuts against the first stepped face 313, and part of the inner wall surface of the first cylinder body 1 is sealed with the second side wall surface 315, so as to achieve sealing to the first cylinder body 1. The first support member 121 of the bottom cover 12 of the first cylinder body 1 is limited by the second groove portion 43 of the second flow guide portion 4. Part of the inner wall surface of one end of the second cylinder body 2 is connected to part of the outer side wall of the second part 32, and part of the inner wall surface of the other end of the second cylinder body 2 is connected to a part of the outer wall surface of the second flow guide portion 4, so as to achieve sealing to the second cylinder body 2. Alternatively, the connection between the second cylinder body 2 and the first flow guide portion 3, and the connection between the second cylinder body 2 and the second flow guide portion 4 may be electromagnetic pulse welding.

Figure 5:
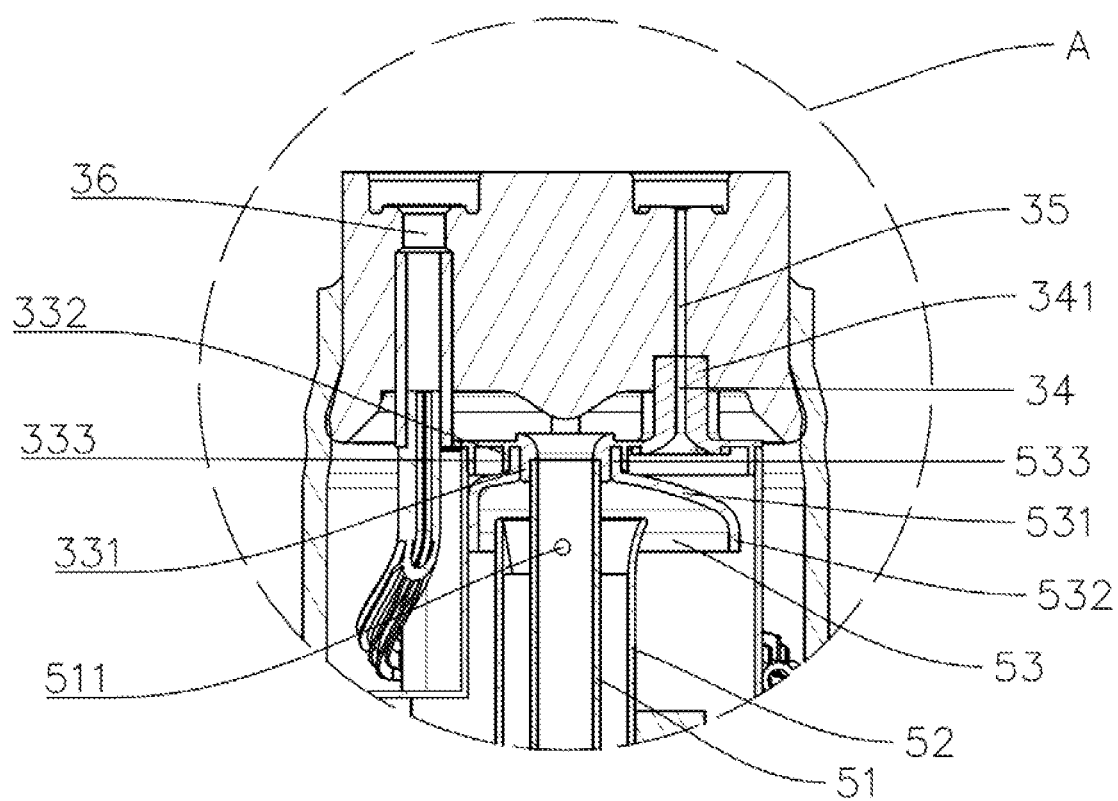
FIG. 5 is a partial enlarged view showing part A of FIG. 4.

In this embodiment, referring to FIG. 4 to FIG. 6, the gas-liquid distribution assembly 5 includes a flow guide pipe 51, a sleeve 52 and a first plate 53. The sleeve 52 is sleeved on an outer side of the flow guide pipe 51. The first plate 53 has a through hole. One end of the flow guide pipe 51 passes through the through hole so that the first plate 53 is sleeved on an upper part of the flow guide pipe 51. The first plate 53 is located above the sleeve 52. A peripheral edge of the through hole of the first plate 53 extends toward the first flow guide portion 3 to form a fourth protruding portion 533. The fourth protruding portion 533 is accommodated in the first groove portion 333. An inner sidewall of the fourth protruding portion 533 is attached to the outer sidewall of the second protruding portion 331. An outer sidewall of the fourth protruding portion 533 is attached to the inner sidewall of the third protruding portion 332 to realize the fixation of the first plate 53. After passing through the through hole of the first plate 53, one end of the flow guide pipe 51 is accommodated in the second protruding portion 331, and its end surface is in contact with the first part 31.

The first plate 53 includes a main body portion 531 and an outer extension portion 532 extending downwardly along an outer edge of the main body portion 531. A gap is formed between an upper surface of the main body portion 531 and the first part 31, so that a first fluid can flow into the second cavity 20 from the second through hole 34. A gap is formed between an outer wall surface of the outer extension portion 532 and the inner wall surface of the first cylinder body 1, so that the first fluid continues to flow downwardly after entering the second cavity 20 from the second through hole 34. A gap is formed between a lower surface of the main body portion 531 and the upper end surface of the sleeve 52, a gap is formed between the inner wall surface of the outer extension portion 532 and the outer wall of the sleeve 52, and one end of the sleeve 52 adjacent to the first plate 53 is opened, so that the second cavity 20 communicates with the inner cavity of the sleeve 52. A diameter of the main body portion 531 is smaller than an inner diameter of the first cylinder body 1 and larger than an outer diameter of the sleeve 52.

A preset distance is formed between the inner wall surface of the sleeve 52 and the outer wall surface of the flow guide pipe 51, so that a third flow channel 60 for the first fluid to flow is formed between the inner wall surface of the sleeve 52 and the outer wall surface of the flow guide pipe 51. One end of the sleeve 52 away from the first plate 53 is sealed, so that the inner cavity of the sleeve 52 is isolated from the second cavity 20 at the end away from the first plate 53. A gap is left between the inner wall surface of the lower end of the flow guide pipe 51 and the lower end surface of the sleeve 52, so that the third flow channel 60 communicates with the inner cavity of the flow guide pipe 51.

In this embodiment, both the sleeve 52 and the flow guide pipe 51 are hollow cylinders with a substantially circular cross-section. One end of the flow guide pipe 51 is connected to the first part 31 and communicated with the third cavity 30, and the other end is open and communicated with the third flow channel 60. One end of the sleeve 52 adjacent to the second flow guide portion 4 is self-sealing, and the other end is open and communicated with the second cavity 20. A limiting structure 521 is provided on the inner side wall of one end of the sleeve 52 adjacent to the second flow guide portion 4, and the end of the flow guide pipe 51 extends into the limiting structure 521, so as to fix the sleeve 52 and the flow guide pipe 51. This can be used to limit the displacement of the sleeve 52, but the design of the limiting structure 521 does not affect the flow of the first fluid. Referring to FIG. 4 and FIG. 6, the limiting structure 521 is three protrusions evenly distributed along a circumference of the inner wall of the sleeve 52 (refer to FIG. 4 and FIG. 6). In some embodiments, the sleeve 52 can be fixed only by the limiting structure 521, or the sleeve 52 can be connected with the first plate 53 to realize the fixation of the sleeve 52, or the sleeve 52 can be connected with the bottom cover 12 to realize the fixation of the sleeve 52.

In some embodiments, a side wall of the flow guide pipe 51 adjacent to one end of the first part 31 is provided with at least one balance hole 511 which communicates with the third flow channel 60 and the inner cavity of the flow guide pipe 51. The balance hole 511 is used to reduce the phenomenon that the liquid first fluid is sucked into the compressor 300 due to the pressure difference when the compressor 300 is stopped.

The gas-liquid separation device 100 is further provided with a filter assembly 71. The filter assembly 71 is fixed to one end of the sleeve 52 adjacent to the bottom cover 12. The filter assembly 71 includes a filter screen 712 and a bracket 711. The bracket 711 abuts between the sleeve 52 and the bottom cover 12 for fixing the filter screen 712, and can also be used to limit the sleeve 52 to reduce the shaking of the gas-liquid distribution assembly 5. The bottom cover 12 may also be provided with a boss or a groove that is matched with the bracket 711. One end of the bracket 711 is sleeved on the outside of the boss or inserted into the groove. In some embodiments, the filter screen 712 and the bracket 711 can be separately molded and then fixed together, or can be integrally molded, such as plastic injection molding.

The sleeve 52 is provided with at least one through hole. The through hole is used to guide an refrigeration oil in the second cavity 20 into the inner cavity of the flow guide pipe 51, so that the refrigeration oil flows to the compressor 300 along with the first fluid. A diameter and arrangement of the through holes are matched according to the capacity of the thermal management system, so that the ratio of the refrigerant oil returning to the compressor 300 to the first fluid can be better. The sleeve 52 includes a bottom wall and a side wall. The bottom wall of the sleeve 52 is provided with at least one first hole 522 axially extending through the sleeve 52. The fluid entering the first hole 522 is filtered through the filter screen 712, which can prevent impurities from entering the compressor 300 through the first hole 522. The side wall of the sleeve 52 is provided with at least one second hole 523 radially extending through the sleeve 52. Taking three second holes 523 as an example, two adjacent second holes 523 are disposed at intervals, and an arrangement direction of the second holes 523 is substantially parallel to the axial direction of the gas-liquid separation device 100.

When the thermal management system is in a cooling mode, there is relatively more refrigerant for circulation in the system, and less liquid refrigerant is stored in the gas-liquid separation device 100. Correspondingly, the height of the liquid level in the second cavity 20 is relatively low, and the density of the refrigerant oil in the gas-liquid separation device 100 in the cooling mode is higher than that of the liquid refrigerant. At this time, the refrigeration oil is mainly guided into the flow guide pipe 51 through the first hole 522 provided on the bottom wall, and the first hole 522 plays a greater role. Of course, at this time, the second hole 523 may also guide part of the first fluid into the third flow channel 50 to flow into the flow guide pipe 51. The refrigeration oil has a certain mutual solubility with the first fluid. The first fluid is mixed with refrigeration oil, and part of the refrigeration oil can also be guided into the flow guide pipe 51. In addition, since the diameters of the first hole 522 and the second hole 523 are relatively small, the first fluid introduced through the second hole 523 is less, and the effect of gas-liquid separation is small. When the thermal management system is in a heating mode, there is relatively less refrigerant for circulation in the system, and more liquid refrigerant is stored in the gas-liquid separation device 100. Correspondingly, the liquid level in the second cavity 20 is relatively high. The density of the refrigeration oil in the gas-liquid separation device 100 in the heating mode is lower than the density of the liquid refrigerant. At this time, the refrigeration oil is mainly guided into the flow guide pipe 51 through the second hole 523 provided on the side wall, and the second hole 523 plays a greater role. In the same way, the first hole 522 also guides part of the first fluid into the flow guide pipe 51, but due to the small diameter of the hole and the mutual solubility of the refrigerant oil and the first fluid, the effect of gas-liquid separation is small. As the working state of the thermal management system changes, the height of the liquid first fluid in the first cylinder body 1 also changes accordingly. Along the axial direction of the gas-liquid separation device, at least two second holes 523 are provided. When the refrigeration oil floats on the liquid first fluid, the purpose of guiding the refrigeration oil into the flow guide pipe 51 under different working states can be achieved.

The reason why the sleeve 52 is provided with the first hole 522 and the second hole 523 at the same time is that the refrigeration oil in the second cavity 20 can be introduced into the inner cavity of the flow guide pipe 51 in the heating mode, the cooling mode or other modes.

In some embodiments, when there are at least two second holes 523, the at least two second holes 523 are linearly distributed. An extending direction of a straight line is parallel to the axial direction of the gas-liquid separation device 100. In some other embodiments, the at least two second holes 523 are not distributed in a straight line. Two adjacent second holes 523 are disposed at intervals along the axial direction parallel to the gas-liquid separation device 100.

In some other embodiments, the sleeve 52 may be sealed and fixed with the bottom cover 12 at one end and open at the other end. One end of the sleeve 52 can also be sealed and fixed to the bottom cover 12, and the other end of the sleeve 52 can be sealed and fixed to the first plate 53. However, the end of the sleeve 52 adjacent to the first plate 53 is provided with an opening. The opening communicates the inner cavity of the sleeve 52 with the second cavity 20. The sleeve 52 can also be sealed at one end but fixed or connected to the bottom cover 12, and the other end is open or connected to the first plate 53. However, the inner cavity of the sleeve 52 adjacent to the end of the first plate 53 communicates with the second cavity 20. One end of the sleeve 52 can also be fixed to the first plate 53, and the other end is sealed by itself and not in contact with the bottom cover 12. The inner cavity of the sleeve 52 at the end adjacent to the first plate 53 communicates with the second cavity 20.

When the gas-liquid separation device 100 works, flow directions of the first fluid are as follows: the first fluid flows into the second cavity 20 from the third through hole 35 through the inner cavity of the first protruding portion 341 and the second through hole 34; the first fluid continues to flow downwardly from the gap between the outer extension portion 532 and the inner wall surface of the first cylinder body 1; after that, the first fluid flows through the gap between the inner wall surface of the outer extension portion 532 and the outer wall surface of the sleeve 52, and the gap between the lower surface of the main body portion 531 and the upper end surface of the sleeve 52 in sequence; the first fluid enters the third flow channel 60 from the upper end of the sleeve 52, and continues to flow downwardly in the third flow channel 60; after that, the first fluid enters the flow guide pipe 51 from the lower end of the flow guide pipe 51 and continues to flow upwardly in the flow guide pipe 51; then, the first fluid enters the third cavity 30 from the first through hole 33; the first fluid enters the first cavity 10 from the gap between the first part 31 and the second part 32, and continues to flow downwardly; and finally, the first fluid flows out of the gas-liquid separation device 100 through the fourth through hole 41 of the second flow guide portion 4 to enter the compressor 300. At this moment, the first fluid has completed the entire process of gas-liquid separation and heat exchange. Wherein, the first fluid exchanges heat with the heat exchange member 6 in the process of flowing in the first cavity 10.

It should be noted that, the first fluid entering the second cavity 20 from the first flow guide portion 3 is usually a first fluid mixed with gas and liquid. After entering the second cavity 20, the liquid first fluid sinks due to gravity, so that the liquid first fluid is stored in the first cylinder body 1 while the gaseous first fluid floats. Under the suction effect of the compressor 300, the first fluid enters the third flow channel 60 from the upper end of the sleeve 52. Therefore, the liquid first fluid remains at the bottom of the first cylinder body 1, and the gaseous first fluid flows through the third cavity 30 and the first cavity 10. Then, the first fluid flows out of the gas-liquid separation device 100 from the second flow guide portion 4 to realize the gas-liquid separation of the first fluid.

In this embodiment, the gas-liquid separation device 100 includes the heat exchange member 6 at least partially located in the first cavity 10. The heat exchange member 6 includes a heat exchange tube 61, a first pipe joint 62 and a second pipe joint 63. The heat exchange tube 61 includes a first end 616 partially accommodated in the first pipe joint 62 and a second end 617 partially accommodated in the second pipe joint 63.

The second part 32 of the first flow guide portion 3 includes a fifth through hole 36 that communicates with the outside of the gas-liquid separation device 100 and the heat exchange member 6. The first pipe joint 62 is fixedly connected to the second part 32. The first pipe joint 62 is at least partially accommodated in the fifth through hole 36. An inner cavity of the first pipe joint 62 communicates with the outside of the gas-liquid separation device 100 and an inner cavity of the heat exchange tube 61. The second flow guide portion 4 includes a sixth through hole 42 that communicates with the outside of the gas-liquid separation device 100 and the heat exchange member 6. The second pipe joint 63 is fixedly connected to the second flow guide portion 4. The second pipe joint 63 is at least partially accommodated in the sixth through hole 42. An inner cavity of the second pipe joint 63 communicates with the outside of the gas-liquid separation device 100 and the inner cavity of the heat exchange tube 61. In some other embodiments, the first end portion 616 may be at least partially received in the fifth through hole 36. The first end portion 616 is directly and fixedly connected to the first flow guide portion 3. The second end portion 617 is at least partially received in the sixth through hole 42. The second end portion 617 is directly and fixedly connected to the second flow guide portion 4.

In this embodiment, at least part of the cylinder body portion 11 of the first cylinder body 1 is recessed in a direction away from the second cylinder body 2 to form a first recess portion 111 and a second recess portion 112. The first recess portion 111 and the second recess portion 112 are spaced apart. Part of the heat exchange tube 61 adjacent to the first flow guide portion 3 is accommodated in the first recess portion 111. Part of the heat exchange tube 61 adjacent to the second flow guide portion 4 is accommodated in the second recess portion 112. Along the axial direction of the gas-liquid separation device 100, the first part 31 is provided with a first avoidance portion 316 at the part corresponding to the first concave part 111, so as to facilitate the connection and assembly of the heat exchange tube 61 and the second part 32. Since the first plate 53 is disposed in the first cylinder body 1 adjacent to the first flow guide portion 3, the first plate 53 is provided with a second avoidance portion 534 at the portion of the first plate 53 corresponding to the first recess portion 111, so as to facilitate the assembly of the first plate 53. Alternatively, the first recess portion 111 and the second recess portion 112 may be communicated with each other. In order to facilitate the connection and assembly of the heat exchange tube 61 and the second flow guide portion 4, the bottom cover 12 may also be provided with an avoidance portion to reduce the bending of the heat exchange tube 61 and reduce the flow resistance of a second medium.

In this embodiment, the heat exchange tube 61 is spirally wound around the first cylinder body 1. One side of the heat exchange tube 61 is in contact with the first cylinder body 1, and the other side is in contact with the second cylinder body 2. The first cylinder body 1, the second cylinder body 2 and the heat exchange tube 61 jointly form a second flow channel 50. The second flow channel 50 is located in the first cavity 10.

In this embodiment, the heat exchange tube 61 includes the first flow channel 40, a tube wall 611 surrounding the first flow channel 40, and a first extension portion 612 protruding beyond the tube wall 611. The first extension portion 612 is located in the second flow channel 50. A cross-sectional shape of the first extension portion 612 is substantially elongated. The first extension portion 612 is located in the second flow channel 50, which can increase the heat exchange area between the heat exchange tube 61 and the first fluid, and improve the effect of heat exchange between the second fluid and the first fluid, thereby improving the heat exchange effect of the gas-liquid separation device. On the other hand, the first extension portion can also play the role of disturbing the flow path of the first fluid, thereby further improving the heat exchange effect between the first fluid and the second fluid. The number of the first extension portion 612 is at least one. In some embodiments, the extending direction of the first extension portion 612 is parallel to the axial direction. In some other embodiments, the extending direction of the first extension portion 612 intersects the axial direction. Referring to FIG. 11A to FIG. 11F, a plurality of the first extension portions 612 are provided. The lengths of the plurality of first extension portions 612 may all be equal, may all be unequal, or may be partially equal and partially unequal. The extending directions of the plurality of first extension portions 612 may all be parallel to the axial direction, may all intersect the axial direction, or may partially be parallel to the axial direction and may partially intersect the axial direction. In some other embodiments, the cross-section of the first extension portion 612 includes but is not limited to a long strip, and can also be a corrugated, a structure with holes, a structure with protrusions or a structure with grooves, which is not limited in the present application, as long as it can play a role in disturbing the flow.

In some other embodiments, the first extension portion 612 may also be in contact with the tube wall 611 in the axial direction of the gas-liquid separation device, or be in contact with a free end of another first extension portion 612, so as to further divide the second flow channel 50 into regions, thereby further increasing the heat exchange effect between the first fluid and the second fluid. The height of the second flow channel 50 in the axial direction may be limited by the length of the first extension portion 612, or may be limited by other means.

The heat exchange tube 61 further includes a second extension portion 613 protruding from the tube wall 611 toward the second cylinder body 2. A free end of the second extension portion 613 is in contact with the inner side wall of the second cylinder body 2. The tube wall 611 on the opposite side to the second extension portion 613 of the heat exchange tube 61 is in contact with the first cylinder body 1. Alternatively, the tube wall 611 on the side opposite to the second extension portion 613 of the heat exchange tube 61 is a plane structure (refer to FIG. 8). The planar structure is fitted with the outer side wall of the first cylinder body 1. The contact between the heat exchange tube 61 and the first cylinder body 1 is surface-to-surface contact. Compared with line-to-line contact, the contact area is larger and the contact is more reliable. A cross section of the second extension portion 613 is substantially elongated. An end surface of one end of the second extension portion 613 away from the tube wall 611 is a plane surface, which increases the contact area between the second extension portion 613 and the second cylinder body 2. In some other embodiments, the cross-section of the second extension portion 613 includes but is not limited to a long strip, and can also be a corrugated shape, a structure with holes, a structure with protrusions, or a structure with grooves, which is not limited in the present application, as long as the mating between the second extension portion 613 and the second cylinder is not affected.

In the present application, the second extension portion 613 protruding out of the tube wall 611 is disposed to make it contact with the second cylinder body 2. Compared with the tube wall 611 directly in contact with the second cylinder body 2, the number of the first extension portions 612 on the tube wall 611 can be increased, thereby further increasing the heat exchange area between the heat exchange tube 61 and the first fluid.

In order to further improve the heat exchange effect between the first fluid and the second fluid, the heat exchange tube 61 may further be provided with a fourth extension portion 615 protruding inwardly from the tube wall 611. The fourth extension portion 615 is disposed in the first flow channel 40. A cross-sectional shape of the fourth extension portion 615 is substantially elongated. The fourth extension portion 615 is located in the first flow channel 40 and plays a role in disturbing the flow path of the second fluid, thereby enhancing the heat exchange effect between the first fluid and the second fluid.

Figure 11A:
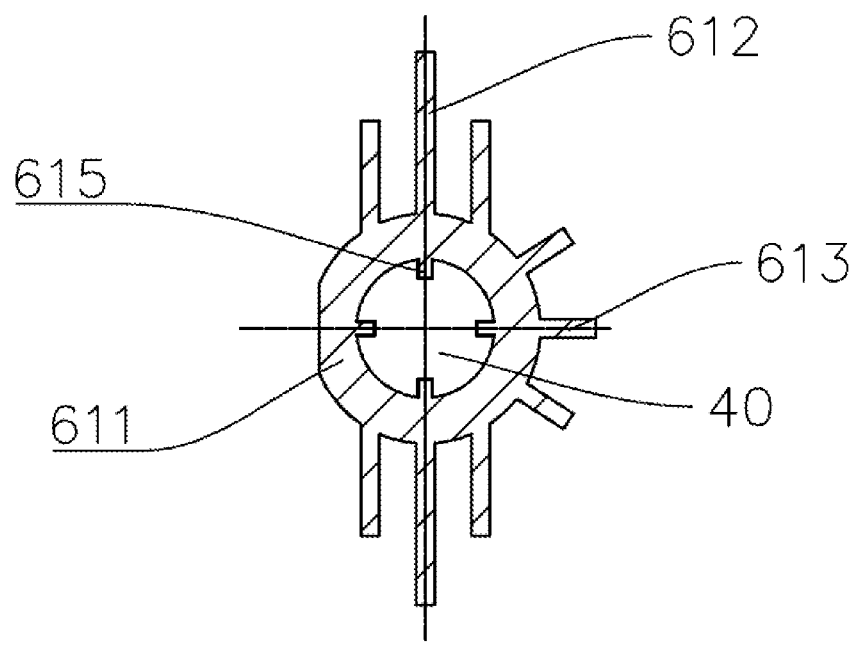
FIG. 11A to FIG. 11F are schematic cross-sectional views of heat exchange tubes of the gas-liquid separation device in multiple embodiments of the present application.
Figure 11B:
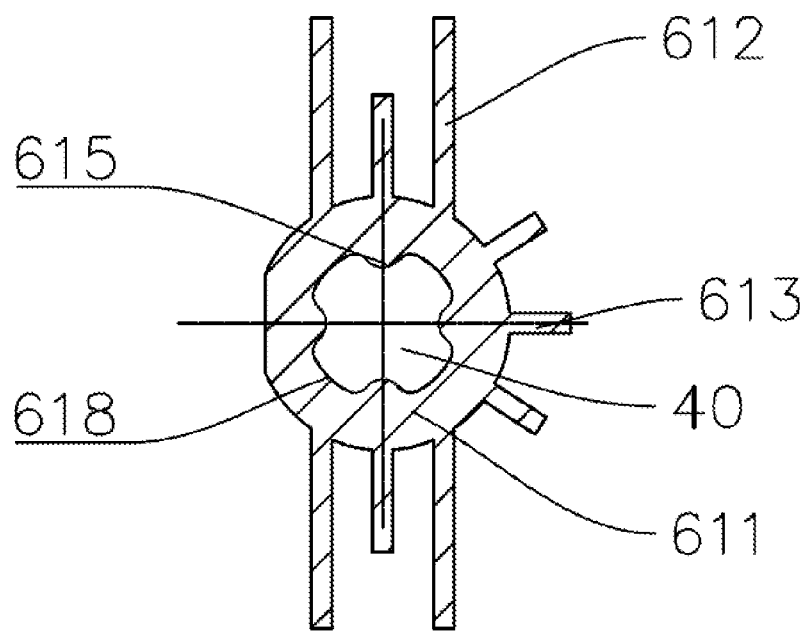
Figure 11C:
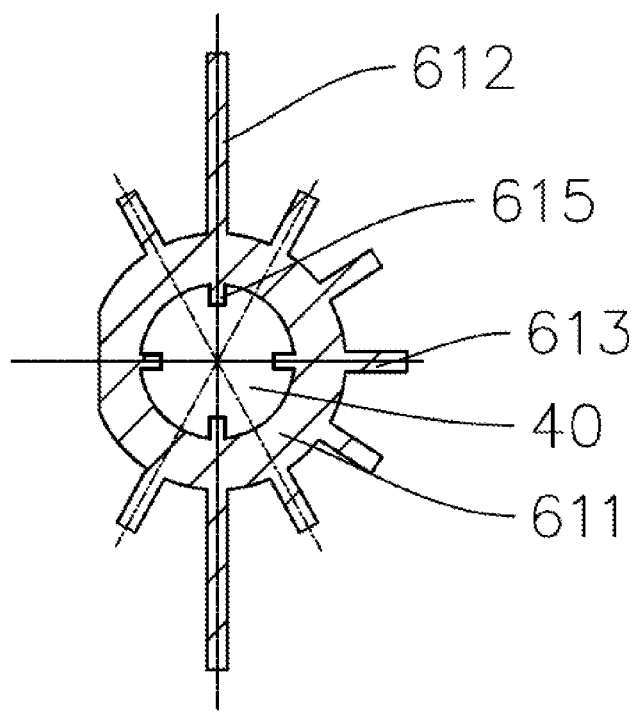

The number of the fourth extension portion 615 is at least one. In some embodiments, the extending direction of the fourth extension portion 615 is parallel to the axial direction. In some embodiments, the extending direction of the fourth extension portion 615 intersects with the axial direction, e.g., is perpendicular to the axial direction. Referring to FIG. 11A to FIG. 11C, a plurality of fourth extension portions 615 are provided. The lengths of the plurality of fourth extension portions 615 may all be equal, may all be unequal, or may be partially equal and partially unequal. The extending directions of the plurality of fourth extension portions 615 may all be parallel to the axial direction, may all intersect the axial direction, or may partially be parallel to the axial direction and may partially intersect the axial direction. In some other embodiments, a cross-section of the fourth extension portion 615 includes, but is not limited to, an elongated shape. For example, the cross-section of the fourth extension portion 615 may also be an arc-shaped convex shape as shown in FIG. 11B. A concave portion 618 is further provided between two adjacent fourth extension portions 615. Both the fourth extension portion 615 and the concave portion 618 can play a role of disturbing the flow. Of course, when the cross-sectional shape of the fourth extension portion 615 is substantially elongated, a concave portion 618 may also be provided to increase the effect of turbulence. In addition, the fourth extension portion 615 may also be a corrugated, a structure with holes, a structure with protrusions or a structure with grooves, which is not limited in the present application, as long as it can play a role in disturbing the flow.

Figure 11D:
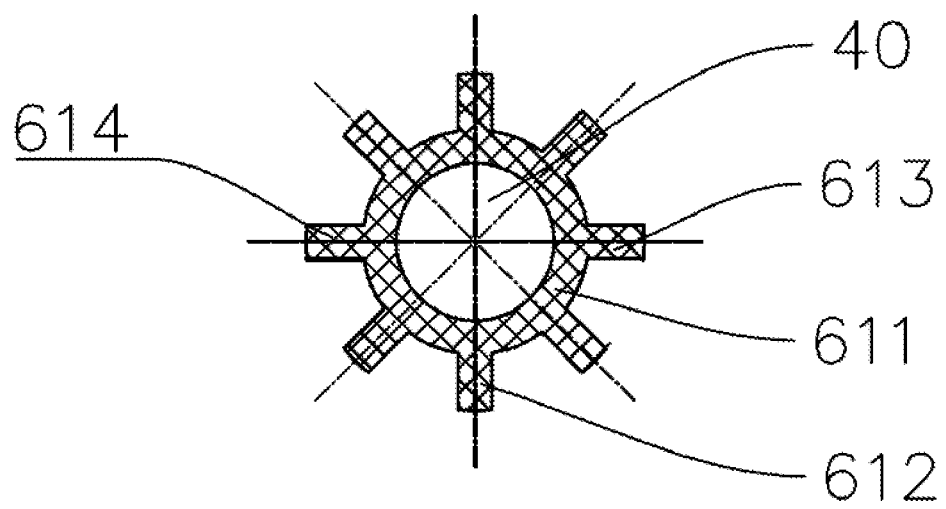
Figure 11E:
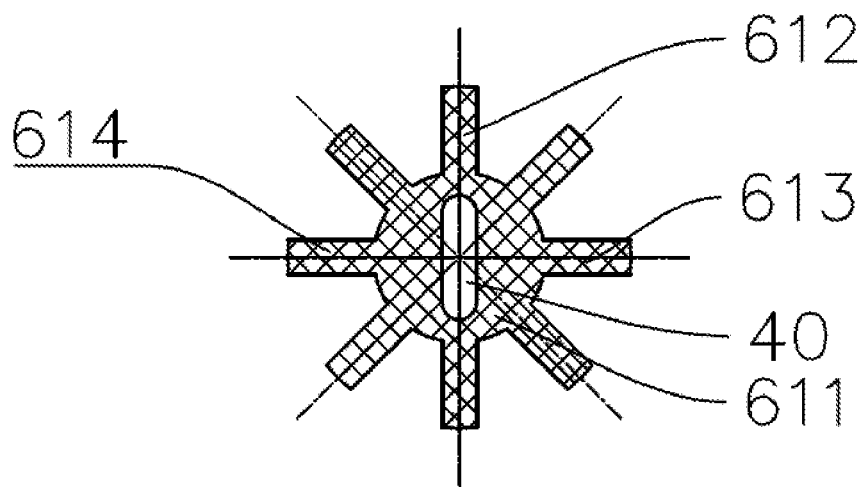
Figure 11F:
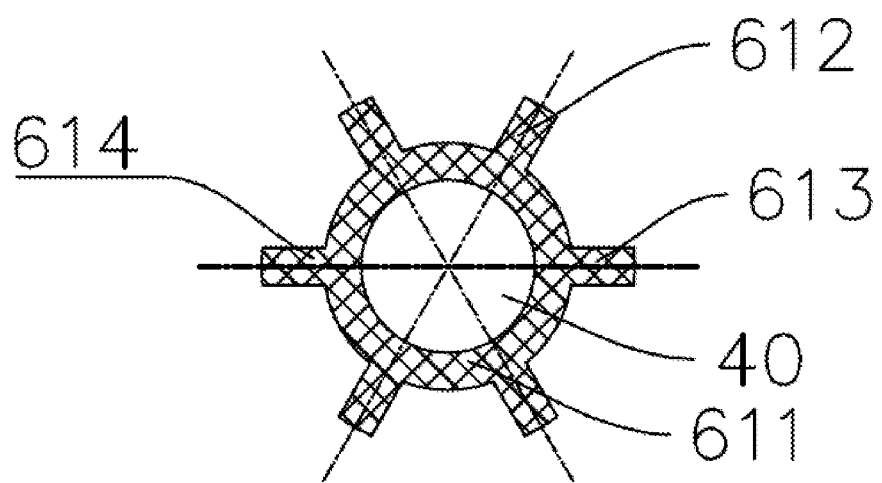

In some other embodiments, referring to FIG. 11D to FIG. 11F, the heat exchange tube 61 further includes a third extension portion 614 protruding from the tube wall 611 toward the second cylinder body 2. A free end of the third extension portion 614 is in contact with the outer side wall of the first cylinder body 1. The tube wall 611 on the opposite side to the third extension portion 614 of the heat exchange tube 61 is in contact with the second cylinder body 2, or the second extension portion 613 located on the opposite side to third extension portion 614 of the heat exchange tube 61 and is in contact with the second cylinder body 2. If the tube wall 611 on the opposite side to third extension portion 614 of the heat exchange tube 61 is in contact with the second cylinder body 2, Alternatively, the tube wall 611 on the side opposite to the third extension portion 614 of the heat exchange tube 61 is a plane structure (refer to FIG. 8). The planar structure is fitted with the inner side wall of the second cylinder body 2. The contact between the heat exchange tube 61 and the second cylinder body 2 is surface-to-surface contact. Compared with line-to-line contact, the contact area is larger and the contact is more reliable. A cross section of the third extension portion 614 is substantially elongated. An end surface of one end of the third extension portion 614 away from the tube wall 611 is a plane surface, which increases the contact area between the third extension portion 614 and the first cylinder body 1. By providing the third extension portion 614, the number of the first extension portions 612 on the tube wall 611 can be further increased, and the heat exchange area between the heat exchange tube 61 and the first fluid can be further increased.

In some other embodiments, the heat exchange tube 61 may not be provided with the fourth extension portion 615. A cross-sectional shape of the first flow channel 40 includes, but is not limited to, a circular shape, and may also be a waist shape, a gear shape, or a special shape, which is not limited in the present application, as long as it does not affect the flow of the second fluid.

In this embodiment, the first extension portion 612, the second extension portion 613, the third extension portion 614 and the fourth extension portion 615 are integrally formed with the tube wall 611, which can simplify the manufacturing and assembling process of the above-mentioned heat exchange member 6. After the heat exchange tube 61 is spirally wound around the first cylinder body 1 and fixed, the tube wall 611, the third extension portion 614, the second extension portion 613, the first extension portion 612 and the fourth extension portion 615 are assembled, and the first flow channel 40 and the second flow channel 50 spirally wound around the first cylinder body 1 are automatically formed.

Regarding the term "contact" in the present application, due to errors of the manufacturing process, the above-mentioned contact may be not completely contacted or only very close without contact, leading most of the first fluid to flow in the second flow channel 50, only a small part of the first fluid to flow through a gap between one side of the heat exchange tube 61 and the first cylinder body 1, or a gap between the other side and the second cylinder body 2. For example, one side of the heat exchange tube 61 is not completely in contact with the first cylinder body 1 or is only very adjacent to but not in contact, and the other side is not completely in contact with the second cylinder body 2 or is only very adjacent to but not in contact, which is not limited in the present application, as long as the purpose of increasing the heat exchange area between the heat exchange tube 61 and the first fluid is not affected.

Since one side of the heat exchange tube 61 is attached to the first cylinder body 1, the other side of the heat exchange tube 61 is attached to the second cylinder body 2, and the heat exchange tube 61 is spirally wound around the first cylinder body 1, both the first flow channel 40 and the second flow channel 50 are disposed spirally around the first cylinder body 1. That is, both the first flow channel 40 and the second flow channel 50 are spiral-shaped flow channels. When the gas-liquid separation device 100 is in a working state, the second fluid in the first flow channel 40 and the first fluid in the second flow channel 50 perform heat exchange. The first flow channel 40 and the second flow channel 50 are both spiral-shaped flow channels, which have a longer heat exchange path and more sufficient heat exchange than the linear-shaped flow channel.

When the gas-liquid separation device 100 works, flow directions of the second fluid in a cooling mode are as follows: the second fluid flows from the sixth through hole 42 through the second pipe joint 63 into the first flow channel 40 of the heat exchange tube 61; the second fluid flows to the first pipe joint 62 along the spiral first flow channel 40; and finally, the second fluid flows out of the gas-liquid separation device 100 from the fifth through hole 36. Flow directions of the second fluid in a heating mode are as follows: the second fluid flows into the first flow channel 40 of the heat exchange tube 61 from the fifth through hole 36 through the first pipe joint 62; the second fluid flows to the second pipe joint 63 along the spiral first flow channel 40; and finally, the second fluid flows out of the gas-liquid separation device 100 from the sixth through hole 42. At this moment, the second fluid completes the entire process of heat exchange. Wherein, in the first cavity 10, the second fluid flowing in the first flow channel 40, and the first fluid flowing in the second flow channel 50 perform heat exchange.

In this embodiment, in the cooling mode, from a viewing angle of the first flow guide portion 3 toward the second flow guide portion 4, the first fluid flows spirally in a clockwise direction, the second fluid flows spirally in a counterclockwise direction, and the first fluid and the second fluid exchange heat in opposite directions. In the heating mode, from a viewing angle of the first flow guide portion 3 toward the second flow guide portion 4, both the first fluid and the second fluid flow spirally in a clockwise direction, and the first fluid and the second fluid exchange heat in the same direction. Alternatively, under the same structure, the heat exchange effect of reverse heat exchange is better than that of co-directional heat exchange. In some other embodiments, in the cooling mode, from the viewing angle of the first flow guide portion 3 toward the second flow guide portion 4, the first fluid and the second fluid both flow spirally in the clockwise direction. That is, the second fluid flows in from the fifth through hole 36 and flows out from the sixth through hole 42. Accordingly, in the heating mode, from the viewing angle of the first flow guide portion 3 toward the second flow guide portion 4, the first fluid flows spirally in the clockwise direction, and the second fluid flows spirally in the counterclockwise direction. That is, the second fluid flows in from the sixth through hole 42 and flows out from the fifth through hole 36.

Referring to FIG. 3, FIG. 4 and FIG. 6, a filter device 72 is provided between the first cylinder body 1 and the second flow guide portion 4. One end of the filter device 72 abuts against the first cylinder body 1, and the other end abuts against the second flow guide 4. The filter device 72 is provided coaxially with the cylinder body portion 11 of the first cylinder body 1. In order to facilitate the assembly and connection of the heat exchange tube 61 and the second flow guide portion 4, the filter device 72 is provided with a third avoidance portion 721 corresponding to the second recess portion 112. The filter device 72 is used for filtering impurities in the first fluid to prevent the impurities from entering the compressor 300 through the fourth through hole 41. The material of the filter device 72 may be a metal material or a non-metal material, as long as it can play a filtering role.

Figure 12:
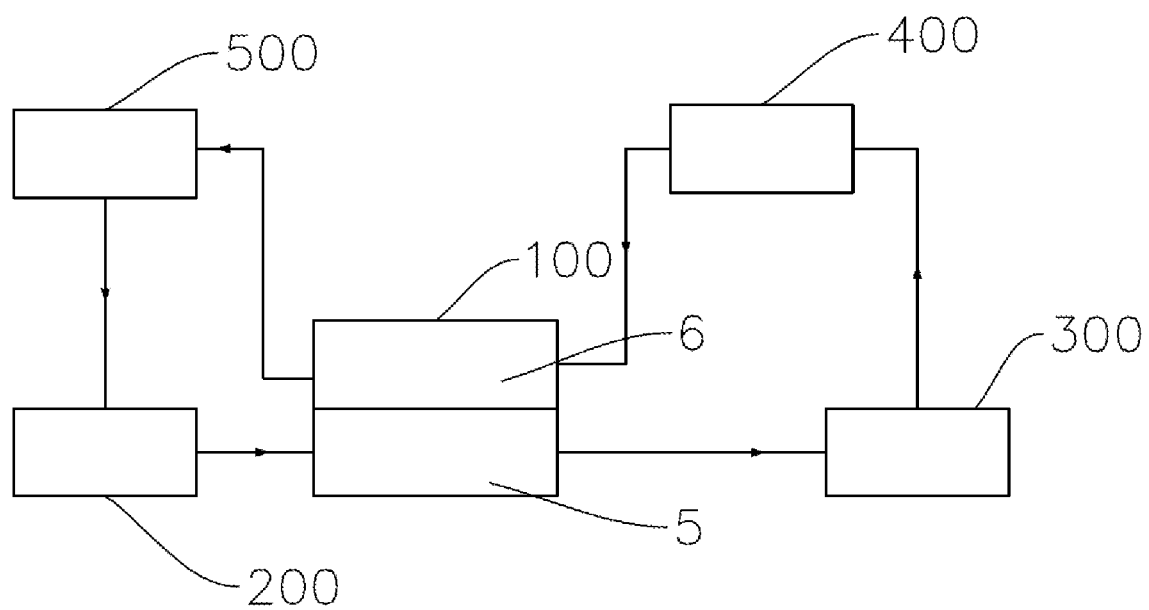
FIG. 12 is a schematic connection view of a thermal management system according to an exemplary embodiment of the present application.

FIG. 12 is a schematic connection view of a thermal management system according to an exemplary embodiment of the present application. Directions indicated by arrows are the refrigerant flow directions. The thermal management system is in a cooling mode. Referring to FIG. 12, the thermal management system includes a gas-liquid separation device 100, an evaporator 200, a compressor 300, a condenser 400 and a throttling device 500. The evaporator 200 communicates with the gas-liquid distribution assembly 5 through the first flow guide portion 3 of the gas-liquid separation device 100. An outlet of the evaporator 200 communicates with the third through hole 35. The compressor 300 communicates with the gas-liquid distribution assembly 5 through the second flow guide portion 4 of the gas-liquid separation device 100. An inlet of the compressor 300 communicates with the fourth through hole 41. The condenser 400 communicates with the heat exchange member 6 through the second flow guide portion 4 of the gas-liquid separation device 100. An outlet of the condenser 400 communicates with the sixth through hole 42. The throttling device 500 communicates with the heat exchange member 6 through the first flow guide portion 3 of the gas-liquid separation device 100. An inlet of the throttle device 500 communicates with the fifth through hole 36. In the cooling mode, a high-temperature gaseous refrigerant flowing out of the compressor 300 flows through the heat exchange member 6 in the gas-liquid separation device 100 after being heat-exchanged by the condenser 400; after the refrigerant is throttled by the throttling device 500, it enters the evaporator 200 for heat exchange; the gas-liquid two-phase refrigerant flowing out of the evaporator 200 enters the gas-liquid separation device 100; and after the gas-liquid separation by the gas-liquid separation device 100, the gaseous refrigerant flows into the compressor 300 to complete a heat exchange cycle. In the gas-liquid separation device 100, through the action of the gas-liquid distribution assembly 5, the liquid refrigerant is stored in the first cylinder body 1. The gaseous refrigerant exchanges heat with the heat exchange member 6. After the heat exchange, the temperature of the gaseous refrigerant increases, and the temperature of the refrigerant flowing in the heat exchange member 6 decreases, so that the temperature of the refrigerant entering the compressor 300 can be raised. In addition, the temperature of the refrigerant flowing into the expansion device 500 is lowered, so that the cooling effect of the evaporator 200 is improved.

In a heating mode, the high-temperature gaseous refrigerant flowing out of the compressor 300 enters the condenser 400 for heat exchange, and then flows through the heat exchange member 6 in the gas-liquid separation device 100 after being throttled by the throttling device 500. Then, the refrigerant enters the evaporator 200 for heat exchange. The gas-liquid two-phase refrigerant flowing out of the evaporator 200 enters the gas-liquid separation device 100. After the gas-liquid separation by the gas-liquid separation device 100, the gaseous refrigerant flows into the compressor 300 to complete a heat exchange cycle.

Since the first flow channel 40 and the second flow channel 50 are both disposed in a spiral shape, the heat exchange path between the first fluid and the second fluid is relatively long, and the heat exchange is more sufficient, thereby making the heat exchange effect between the two is better.

It should be understood in the present application that the above-mentioned first fluid and second fluid are both refrigerants. The first fluid is the refrigerant flowing out of the evaporator 200. The second fluid is the refrigerant flowing out of the condenser 400 or the throttling device 500.

"Substantially" and "approximately" mentioned in the present application means that the similarity is more than 50%. For example, when the first cylinder body 1 is approximately cylindrical, it means that the first cylinder body 1 has a hollow cylindrical shape, a side wall of the first cylinder body 1 may be provided with a recess portion or a convex structure, and a contour of a cross-section of the first cylinder body 1 is not circular, but 50% of the contour consists of arcs.

The above descriptions are only preferred embodiments of the present application, and do not limit the present application in any form. Although the present application has been disclosed as above with preferred embodiments, it is not intended to limit the present application. Any person skilled in the art, within the scope of the technical solution of the present application, can make some changes or modifications by using the technical contents disclosed above to be equivalent embodiments of equivalent changes. However, any simple modifications, equivalent changes and modifications made to the above embodiments according to the technical essence of the present application without departing from the content of the technical solutions of the present application still fall within the scope of the technical solutions of the present application.

What is claimed is:

1. A gas-liquid separation device, comprising: a first cylinder body, a second cylinder body, a first flow guide portion, a second flow guide portion, a gas-liquid distribution assembly and a heat exchange member;

the first cylinder body being located inside the second cylinder body, the gas-liquid separation device having a first cavity and a second cavity, the first cavity being located in the second cylinder body, the first cavity being located outside the first cylinder body, the second cavity at least comprising a space within the first cylinder body;

the first flow guide portion being fixed with the second cylinder body, the second flow guide portion being fixed with the second cylinder body, the first flow guide portion being located at one end of the second cylinder body in an axial direction, the second flow guide portion being located at another end of the second cylinder body in the axial direction, the first flow guide portion having a third cavity;

the gas-liquid distribution assembly being fixed with the first flow guide portion, the gas-liquid distribution assembly being at least partially located in the second cavity, the gas-liquid distribution assembly communicating with the second cavity and the third cavity, the third cavity being in fluid communication with the first cavity;

the heat exchange member comprising a heat exchange tube spirally wound around the first cylinder body, the heat exchange tube being at least partially located in the first cavity, one side of the heat exchange tube being adjacent to or attached to the first cylinder body, another side of the heat exchange tube being adjacent to or attached to the second cylinder body, the heat exchange tube comprising a first flow channel, a tube wall surrounding the first flow channel, and a first extension portion protruding from the tube wall, a second flow channel being formed between the first cylinder body, the second cylinder body and the heat exchange tube, the first extension portion being located in the second flow channel, the first flow channel being not in communication with the second flow channel.

2. The gas-liquid separation device according to claim 1, wherein the heat exchange tube further comprises a protruding portion protruding from the tube wall, and the protruding portion is in contact with at least one of the first cylinder body and the second cylinder body.

3. The gas-liquid separation device according to claim 2, wherein the protruding portion comprises a second extension portion and a third extension portion, the third extension portion extends from the tube wall toward the first cylinder body, a free end of the third extension portion is adjacent to or attached to the first cylinder body, the second extension portion extends from the tube wall toward the second cylinder body, and a free end of the second extension portion is adjacent to or attached to the second cylinder body.

4. The gas-liquid separation device according to claim 3, wherein the free end of the third extension portion is fixed with the first cylinder body by brazing, a shape of an end surface of the free end of the third extension portion matches a shape of a wall surface of the first cylinder body, the free end of the second extension portion is fixed with the second cylinder body by brazing, a shape of an end surface of the free end of the second extension portion matches a shape of a wall surface of the second cylinder body.

5. The gas-liquid separation device according to claim 2, wherein the protruding portion is adjacent to or attached to the first cylinder body, and a part of the tube wall on a side opposite to the protruding portion of the heat exchange tube is adjacent to or attached to the second cylinder body; or, the protruding portion is adjacent to or attached to the second cylinder body, and a part of the tube wall on a side opposite to the protruding portion of the heat exchange tube is adjacent to or attached to the first cylinder body.

6. The gas-liquid separation device according to claim 1, wherein both the first flow channel and the second flow channel are spirally wound around the first cylinder body; when the gas-liquid separation device is in a working state, a fluid in the second flow channel exchanges heat with a fluid in the first flow channel; a flow direction of the fluid in the second flow channel is opposite to a flow direction of the fluid in the first flow channel; or, a flow direction of the fluid in the second flow channel is the same as a flow direction of the fluid in the first flow channel.

7. The gas-liquid separation device according to claim 1, wherein the heat exchange tube comprises a plurality of the first extension portions, a free end of one of the first extension portions is in contact with the tube wall of the heat exchange tube, or a free end of one of the first extension portions is adjacent to or attached to a free end of another first extension portion.

8. The gas-liquid separation device according to claim 1, wherein the heat exchange tube further comprises a plurality of fourth extension portions, the fourth extension portions protrude inwardly from the tube wall, and the fourth extension portions are located in the first flow channel.

9. The gas-liquid separation device according to claim 1, wherein the first flow guide is provided with a first flow channel and a third flow channel which communicate with an outside of the gas-liquid separation device, respectively; the first flow channel communicates with the second cavity; the second flow guide is provided with a second flow channel and a fourth flow channel which communicate with the outside of the gas-liquid separation device, respectively; the second flow channel communicates with the first cavity; one end of the heat exchange tube is connected with the first flow guide portion, and another end of the heat exchange tube is connected with the second flow guide portion; the third channel communicates with the first flow channel, and the fourth channel communicates with the first flow channel.

10. The gas-liquid separation device according to claim 1, wherein the heat exchange member comprises a first pipe joint connected with the first flow guide and a second pipe joint connected with the second flow guide; one end of the heat exchange tube is connected with the first pipe joint, and another end of the heat exchange tube is connected with the second pipe joint; an inner cavity of the first pipe joint communicates with the first flow channel, and an inner cavity of the second pipe joint communicates with the first flow channel.

11. The gas-liquid separation device according to claim 1, wherein the gas-liquid distribution assembly comprises a flow guide pipe and a sleeve, the sleeve is sleeved on an outside of the flow guide pipe, the flow guide pipe is connected with the first flow guide portion, the sleeve is connected with the flow guide pipe or the first flow guide portion, the flow guide pipe is at least partially located in the second cavity;

an inner cavity of the flow guide pipe communicates with the third cavity, a port of the flow guide pipe away from the first flow guide portion communicates with an inner cavity of the sleeve, a port of the sleeve adjacent to the first flow guide portion communicates with the second cavity.

12. The gas-liquid separation device according to claim 11, wherein the sleeve comprises a side wall and a bottom wall, the bottom wall is provided with at least one first hole extending through the bottom wall along a thickness direction of the bottom wall, the side wall is provided with at least one second hole extending through a thickness direction of the side wall, the first hole communicates with the second cavity and the inner cavity of the sleeve, and the second hole communicates with the second cavity and the inner cavity of the sleeve.

13. The gas-liquid separation device according to claim 1, wherein the heat exchange tube is an integral structure, a cross-sectional shape of the first extension portion is one or a combination of at least two of an elongated shape, a corrugated shape and a special-shaped structure.

14. A thermal management system, comprising: a gas-liquid separation device, an evaporator, a compressor, a condenser and a throttling device;

the gas-liquid separation device comprising a first cylinder body, a second cylinder body, a first flow guide portion, a second flow guide portion, a gas-liquid distribution assembly and a heat exchange member;

the first cylinder body being located inside the second cylinder body, the gas-liquid separation device having a first cavity and a second cavity, the first cavity being located in the second cylinder body, the first cavity being located outside the first cylinder body, the second cavity at least comprising a space inside the first cylinder body;

the first flow guide portion being fixed with the second cylinder body, the second flow guide portion being fixed with the second cylinder body, the first flow guide portion being located at one end of the second cylinder body in an axial direction, the second flow guide portion being located at another end of the second cylinder body in the axial direction, the first flow guide portion having a third cavity;

the gas-liquid distribution assembly being fixed with the first flow guide portion, the gas-liquid distribution assembly being at least partially located in the second cavity, the gas-liquid distribution assembly communicating with the second cavity and the third cavity, the third cavity being in fluid communication with the first cavity;

the heat exchange member comprising a heat exchange tube surrounding the first cylinder body, the heat exchange tube being at least partially located in the first cavity, one side of the heat exchange tube being adjacent to or attached to the first cylinder body, another side of the heat exchange tube being adjacent to or attached to the second cylinder body, the heat exchange tube comprising a tube wall and a plurality of protrusions protruding from the tube wall, free ends of some of the protrusions being adjacent to or fit with the first cylinder body, the gas-liquid separation device having a first flow channel and a second flow channel, the first flow channel being located in the heat exchange tube, the second flow channel being located between the first cylinder body, the second cylinder body and the heat exchange tube, the protrusions extending to the second flow channel, the first flow channel being not in communication with the second flow channel;

an outlet of the compressor communicating with an inlet of the condenser, an outlet of the condenser communicating with the first flow channel, an inlet of the throttling device communicating with the first flow channel, an outlet of the throttling device communicating with an inlet of the evaporator, an outlet of the evaporator communicating with the second cavity, an inlet of the compressor communicating with the first cavity and the second flow channel.

15. The thermal management system according to claim 14, wherein both the first flow channel and the second flow channel are spirally wound around the first cylinder body; when the gas-liquid separation device is in a working state, a fluid in the second flow channel exchanges heat with a fluid in the first flow channel; a flow direction of the fluid in the second flow channel is opposite to a flow direction of the fluid in the first flow channel; or, a flow direction of the fluid in the second flow channel is the same as a flow direction of the fluid in the first flow channel.

16. The thermal management system according to claim 14, wherein the heat exchange tube comprises a plurality of fourth extension portions, the fourth extension portions protrude inwardly from the tube wall, and the fourth extension portions are located in the first flow channel.

17. A gas-liquid separation device, comprising:
a first cylinder body defining a second cavity extending along a longitudinal direction;
a second cylinder body receiving the first cylinder body therein, the gas-liquid separation device defining a first cavity located between an outer wall of the first cylinder body and an inner wall of the second cylinder body;
a first flow guide portion retained to a first side of the second cylinder body;
a second flow guide portion retained to a second side of the second cylinder body, the second side and the first side being disposed at two opposite sides of the second cylinder body;
a heat exchange tube disposed in the first cavity, the heat exchange tube comprising a first end connecting to the first flow guide portion and a second end connecting to the second flow guide portion;
wherein the heat exchange tube comprises a tube wall and a plurality of protrusions protruding from the tube wall, the protrusions are distributed along a circumferential direction of the tube wall, the protrusions are spaced apart from each other, and the protrusions connect with the outer wall of the first cylinder body.

18. The gas-liquid separation device according to claim 17, wherein the heat exchange tube comprises a first flow channel enclosed by the tube wall; a second flow channel is formed between the first cylinder body, the second cylinder body and the heat exchange tube; the plurality of protrusions are located in the second flow channel; and the first flow channel is not in communication with the second flow channel.

19. The gas-liquid separation device according to claim 18, wherein the plurality of protrusions comprise a first extension portion, a second extension portion and a third extension portion, the second extension portion extends from the tube wall toward the second cylinder body, a free end of the second extension portion is adjacent to or attached to the second cylinder body, the third extension portion extends from the tube wall toward the first cylinder body, and a free end of the third extension portion is adjacent to or attached to the first cylinder body.

20. The gas-liquid separation device according to claim 19, wherein the heat exchange tube further comprises a plurality of fourth extension portions, the fourth extension portions protrude inwardly from the tube wall, and the fourth extension portions are located in the first flow channel.

* * * * *